US008541082B2

(12) United States Patent
Inaba

(10) Patent No.: US 8,541,082 B2
(45) Date of Patent: Sep. 24, 2013

(54) LAMINATED RESIN FORMED BODY, METHOD FOR PRODUCING LAMINATED RESIN FORMED BODY, AND MULTILAYER ARTICLE

(75) Inventor: Takeshi Inaba, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 219 days.

(21) Appl. No.: 10/560,910

(22) PCT Filed: Jun. 16, 2004

(86) PCT No.: PCT/JP2004/008452
§ 371 (c)(1),
(2), (4) Date: Dec. 16, 2005

(87) PCT Pub. No.: WO2004/110756
PCT Pub. Date: Dec. 23, 2004

(65) Prior Publication Data
US 2007/0098939 A1    May 3, 2007

(30) Foreign Application Priority Data

Jun. 17, 2003    (JP) ................................. 2003-172257

(51) Int. Cl.
*B29D 22/00*    (2006.01)
*B29D 23/00*    (2006.01)
*B32B 1/08*    (2006.01)

(52) U.S. Cl.
USPC ..... 428/36.91; 428/34.1; 428/35.7; 428/36.6; 428/36.9; 138/141; 264/464; 264/171.11; 264/171.1

(58) Field of Classification Search
USPC .................. 428/343, 475.2, 421, 422, 36.91, 428/483; 526/250; 156/244.11, 244.17, 156/244.23, 331.1, 333; 138/140, 141, 137
See application file for complete search history.

(56) References Cited

U.S. PATENT DOCUMENTS

| 5,804,670 | A  | 9/1998  | Stoeppelmann |
|-----------|----|---------|--------------|
| 5,869,190 | A  | 2/1999  | Stoeppelmann |
| 6,156,400 | A  | 12/2000 | Jing et al.  |
| 6,372,870 | B1 | 4/2002  | Kitahara et al. |
| 6,680,124 | B1 | 1/2004  | Araki et al. |
| 6,740,375 | B1 | 5/2004  | Sagisaka et al. |
| 6,776,195 | B2 * | 8/2004 | Blasko et al. ................. 138/141 |
| 6,881,460 | B2 * | 4/2005 | Inaba et al. ................ 428/36.91 |
| 2003/0157335 | A1 | 8/2003 | Inaba et al. |

FOREIGN PATENT DOCUMENTS

| CN | 1261379 A    | 7/2000  |
| CN | 1384861 A    | 12/2002 |
| EP | 0767190 A1   | 4/1997  |
| EP | 0979968 A2   | 2/2000  |
| EP | 0 992 518 A1 | 4/2000  |
| EP | 1 270 208 A1 | 1/2003  |
| JP | 5-8353       | 1/1993  |
| JP | 8-142151     | 6/1996  |
| JP | 9-131815     | 5/1997  |
| JP | 9-194815     | 7/1997  |
| JP | 9-194815 A   | 7/1997  |
| JP | 10-286897    | 10/1998 |
| JP | 2002257269 A | 9/2002  |
| WO | WO 98/58973  | 12/1998 |
| WO | WO 98/58973 A1 | 12/1998 |
| WO | WO 99/45044  | 9/1999  |
| WO | WO 01/58686 A1 | 8/2001 |

OTHER PUBLICATIONS

Final Office Action dated Sep. 15, 2011 for U.S. Appl. No. 12/196,219.

* cited by examiner

Primary Examiner — Ellen S Raudenbush
(74) Attorney, Agent, or Firm — Sughrue Mion, PLLC

(57) ABSTRACT

It is an object of the present invention to provide a laminated resin molding which comprises a layer of a thermoplastic polymer such as a thermoplastic elastomer and a layer of a thermoplastic resin such as a fluorine-containing ethylenic polymer, is excellent in liquid chemical impermeability, chemical resistance and bacteria resistance, among others, and can be molded by coextrusion without causing foaming or deterioration of the thermoplastic elastomer and, further, has good interlaminar adhesive strength.

The invention provides a laminated resin molding comprising a thermoplastic polymer layer (A), a polyamide-based resin layer (B) and a thermoplastic resin layer (C), wherein said thermoplastic polymer layer (A), said polyamide-based resin layer (B) and said thermoplastic resin layer (C) are laminated in that order and firmly adhered to one another, said thermoplastic polymer is to adhere to the polyamide-based resin by thermal fusion bonding, said polyamide-based resin has an amine value of 10 to 60 (equivalents/$10^6$ g), said thermoplastic resin contains a functional group and is to thereby firmly adhere to said polyamide-based resin by thermal fusion bonding, said functional group contains carbonyl group.

9 Claims, No Drawings

LAMINATED RESIN FORMED BODY, METHOD FOR PRODUCING LAMINATED RESIN FORMED BODY, AND MULTILAYER ARTICLE

TECHNICAL FIELD

The present invention relates to a laminated resin molding and a method of producing the same as well as a multilayer molded article comprising the laminated resin molding.

BACKGROUND ART

Fluororesins are excellent in such characteristics as chemical resistance, nonstickiness, gas barrier properties, elution resistance, antifouling properties and bacteria resistance and, therefore, are used for the usage of liquid chemical-transport tubes, tubes for feeding coatings, tubes for drinks and other tubes for industrial use. Since, however, they are expensive, laminated tubes comprising a fluororesin layer and a layer of one of various thermoplastic resins which covers the outer peripheral surface of the fluororesin layer have been proposed.

Laminated resin moldings resulting from lamination of a polyamide resin layer with a fluororesin layer are said to be suited for use as multilayer molded articles required to have good mechanical characteristics and low permeability for liquid chemicals, such as solvents and fuels, which cause deterioration of the polyamide resin, for example, automobile fuel piping tubes or hoses.

As regards multilayer tubes the outer layer of which is made of a polyamide resin, with the inner layer being made of a fluororesin, it has been proposed that the tubes be irradiated to introduce crosslinked structures among molecules of both layers and thereby secure the adhesion between the polyamide resin layer and fluororesin layer (cf. e.g. Patent Document 1). For practicing this technology, however, it is indispensable to introduce expensive equipment and, in addition, the procedural steps become complicated; this is a great problem from the productivity viewpoint.

On the idea that fluororesins themselves should be improved to enable the employment of the coextrusion technique excellent in productivity, various fluororesin materials have been proposed. As one of them, a carbonate and/or haloformyl group-containing, fluorine-containing ethylenic polymer has been disclosed as a fluororesin for use in producing laminates together with a polyamide resin (cf. e.g. Patent Document 2).

However, for use as liquid chemical-transport tubes, tubes for feeding coatings, tubes for drinks or other tubes for industrial use or certain fuel tubes, such resin laminates made of a polyamide resin layer and a fluororesin layer are unsatisfactory in flexibility and, since the polyamide resin is a crystalline resin, the problem of low transparency is encountered in the fields of application where the visibility from the outside is required.

On the other hand, thermoplastic elastomers such as polyurethane-based elastomers have characteristics similar to those of vulcanized rubbers and at the same time can be molded in the same manner as ordinary thermoplastic resins and, in addition, they are excellent in such characteristics as flexibility and transparency; hence, they are used in a wide range of applications, typically in tubes for industrial use. However, there is a problem, namely thermoplastic elastomers are inferior in chemical resistance, chemical liquid impermeability, and bacteria resistance, among others.

To solve the problems with thermoplastic elastomers, resin laminates have been proposed which comprise a layer of a fluororesin excellent in chemical resistance, liquid chemical impermeability and bacteria resistance as well as in nonstickiness, elution resistance and antifouling properties, among others, and a layer of one of various thermoplastic resins as laid on the outer surface of the fluororesin layer.

Thus, a tube resulting from lamination by coextrusion using poly(vinylidene fluoride), for instance, as the fluororesin has been disclosed as the laminate composed of a polyurethane-based elastomer layer and a fluororesin layer (cf. e.g. Patent Document 3 and Patent Document 4). However, the tube obtained is insufficient in interlaminar bonding between the polyurethane-based elastomer layer and fluororesin layer, hence readily undergoes delamination upon repeated bending and vibration during use and, in addition, it has a problem in that it is insufficient in liquid chemical impermeability and chemical resistance.

In cases where a thermoplastic elastomer layer and a fluororesin layer are subjected to lamination with a polyamide resin layer as an intermediate layer, the polyamide resin, when heated and melted in the step of molding, generally tends to be decomposed with ease to generate low-molecular-weight substances or to gelate. To avoid this and simultaneously prevent the discoloration due to oxidation etc., a monocarboxylic acid or a derivative thereof is generally added in the step of polymerization to effect the so-called terminal blocking. Therefore, the polyamide resins in wide use generally have an amine value of lower than 10 (equivalents/$10^6$ g).

When the polyamide resin has an amine value of lower than 10 (equivalents/$10^6$ g), it is necessary to carry out the coextrusion with the fluororesin at a high temperature of at least 260° C. to attain a sufficient level of interlaminar adhesive strength between the polyamide resin layer and fluororesin layer. At such a high temperature, however, the thermoplastic elastomer causes troubles in the molding step, for example foaming, so that the art has the problem that the polyamide resin and fluororesin cannot be coextruded.

As regards the resin laminate comprising a polyamide resin layer as the outer layer and a fluorine-containing ethylenic polymer layer as the inner layer, it is described in the art that a rubber layer may be provided as the outermost layer (cf. e.g. Patent Document 5). This description, however, only gives a rubber layer as the layer usable as the outermost layer, without giving any concrete description about the rubber species, the laminating conditions or the effects of the rubber layer provided, etc.

A resin laminate consisting of a fluorine-containing ethylenic polymer layer, a polyamide resin layer and a thermoplastic elastomer layer as laminated in that order has been disclosed (cf. e.g. Patent Document 6). This patent document, however, gives no description about such a specific feature of the polyamide resin as the amine value thereof.

Thus, in the art, there is no technology available of coextruding a thermoplastic elastomer, a polyamide resin and a fluororesin, and no resin laminates produced by lamination of a fluororesin with a thermoplastic elastomer are excellent in interlaminar bonding, chemical resistance or transparency.

There are further problems; when such resin laminates produced by lamination of a polyamide resin layer and a fluororesin layer are used under such severe conditions that each face of the laminates is in contact with a liquid chemical, the polyamide resin may be deteriorated as a result of penetration of the liquid chemical from the polyamide resin side, rendering the laminates no more fully durable in practical use, or the laminates may change markedly in size as a result of swelling of the polyamide resin and/or elution of the additive(s) contained in the laminates. Further, the use of a fluororesin in the form of a single layer produces not only the expensiveness problem mentioned above but also the problem that the strength is insufficient, which is a weak point of the fluororesin.

When such resin laminates consisting of a polyamide resin layer and a fluororesin layer laminated with each other are used as underground tubes in gas stations, in particular, they are generally used in the form of double tubes and, in that case, it is likely for the inner tube to come into contact with a fuel both on the outer side and on the inner side, and the outer tube is of course buried in the ground. Therefore, both tubes are required to have low fuel permeability and sufficient tube strength for embedment while retaining such characteristics as chemical resistance, nonstickiness, elution resistance, antifouling properties and bacteria resistance on both sides. However, there is no one available that satisfies all of such requirements.

Patent Document 1: Japanese Kokai Publication H05-8353
Patent Document 2: International Laid-open Patent Application WO 99/45044
Patent Document 3: Japanese Kokai Publication H08-142151
Patent Document 4: Japanese Kokai Publication H10-286897
Patent Document 5: International Laid-open Patent Application WO 01/58686
Patent Document 6: International Laid-open Patent Application WO 98/58973

DISCLOSURE OF INVENTION

Problems which the Invention is to Solve

In view of the above-discussed state of the art, it is an object of the present invention to provide a laminated resin molding which comprises a layer of a thermoplastic polymer such as a thermoplastic elastomer and a layer of a thermoplastic resin such as a fluorine-containing ethylenic polymer, is excellent in liquid chemical impermeability, chemical resistance and bacteria resistance, among others, and can be molded by coextrusion without causing foaming or deterioration of the thermoplastic elastomer and, further, has good interlaminar adhesive strength.

Another object, in addition to the above object, of the invention is to (1) provide the above-mentioned laminated resin molding with flexibility (hereinafter sometimes referred to as "first object of the invention") or (2) provide the above-mentioned laminated resin molding with nonstickiness, elution resistance, antifouling properties and resin molding-due strength to thereby provide a laminated resin molding sufficiently durable in practical use while maintaining the above characteristics even under severe conditions such that both faces of the laminate are in contact with a liquid chemical, with the changes in size of the laminate due to resin deterioration or swelling or additive elution being suppressed as far as possible (hereinafter sometimes referred to as "second object of the invention") by selecting the thermoplastic polymer species.

Means for Solving the Problems

This invention provides a laminated resin molding comprising a thermoplastic polymer layer (A), a polyamide-based resin layer (B) and a thermoplastic resin layer (C), wherein said thermoplastic polymer layer (A), said polyamide-based resin layer (B) and said thermoplastic resin layer (C) are laminated in that order and firmly adhered to one another, said thermoplastic polymer is to adhere to the polyamide-based resin by thermal fusion bonding, said polyamide-based resin has an amine value of 10 to 60 (equivalents/$10^6$ g), said thermoplastic resin contains a functional group and is to thereby firmly adhere to said polyamide-based resin by thermal fusion bonding, said functional group contains carbonyl group.

The invention provides, as the means for accomplishing the first object of the invention, in particular, a method for producing the above laminated resin molding, which comprises laminating by the simultaneous multilayer coextrusion technique using a coextruding machine comprising a die and a plurality of extruders each for feeding a resin to said die, said die temperature being not higher than 250° C.

This invention further provides a multilayer molded article comprising the above laminated resin molding.

In the following, the present invention is described in detail.

The laminated resin molding of the invention comprises a thermoplastic polymer layer (A), a polyamide-based resin layer (B) and a thermoplastic resin layer (C). The thermoplastic polymer layer (A), the polyamide-based resin layer (B) and the thermoplastic resin layer (C) are laminated in that order.

The thermoplastic polymer forming the thermoplastic polymer layer (A) in the laminated resin molding of the invention is to adhere to the polyamide-based resin by thermal fusion bonding. The phrase "adhesion by thermal fusion bonding" means that when the laminated resin molding according to the invention as produced by thermal fusion bonding is tested, the initial adhesive strength between the thermoplastic polymer layer (A) and the polyamide-based resin layer (B) is not lower than 25 N/cm. The "adhesion by thermal fusion bonding" includes, within the meaning thereof, the case of impossibility of layer separation. The initial adhesive strength is given herein in terms of the value obtained by the initial adhesive strength measurement method described later herein.

The thermoplastic polymer is not particularly restricted but may be any of those capable of being adhered to the polyamide-based resin by thermal fusion bonding. In achieving the first object of the invention, however, a flexible one is preferred; thus, that polymer preferably has a 100% modulus value of not exceeding 35 MPa, more preferably not exceeding 20 MPa, as determined in accordance with JIS K 7311. A sufficient level of mechanical strength can be attained even if the 100% modulus value is not lower than 2 MPa, for instance, provided that it is not higher than 35 MPa.

As the thermoplastic polymer, there may be mentioned, for example, a thermoplastic resin and a thermoplastic elastomer. The thermoplastic resin includes polyolefin resins such as polyethylene and polypropylene; polyester resins such as polyethylene terephthalate [PET] and polybutylene terephthalate [PBT]; polycarbonate resins; poly(vinyl chloride) resins; fluororesins; and modified resins derived from these and/or mixtures of two or more of these.

Unless otherwise specified, the term "thermoplastic polymer" as used herein means the one forming the thermoplastic polymer layer (A) mentioned above. The thermoplastic polymer so referred to herein is the one forming the thermoplastic polymer layer (A) and conceptually differs from the polyamide-based resin forming the polyamide-based resin layer (B) and from the thermoplastic resin forming the thermoplastic resin layer (C) in that it is not limited either to the one having an amine value within the range mentioned later herein or to the carbonyl group-containing one described later herein. In the same manner as the thermoplastic polymer conceptually differs from the thermoplastic resin forming the thermoplastic resin layer (C), those thermoplastic resins enumerated hereinabove as examples of the thermoplastic polymer conceptually differ from the thermoplastic resin forming the thermoplastic resin layer (C). In forming one laminated resin molding belonging to the laminated resin molding of the invention, the resin/polymer used as the above-mentioned thermoplastic polymer, that used as the polyamide-based resin for forming the polyamide-based resin layer (B) and that used as the thermoplastic resin for forming the thermoplastic resin layer (C) may be the same or different in kind from one another, or the resin/polymer used as the thermoplastic polymer and that used as the thermoplastic resin for forming the thermoplastic resin layer (C) may be of the same kind.

The thermoplastic elastomer has rubber elasticity at ordinary temperature and, at elevated temperatures, it is plasticated and can be molded into desired shapes and forms. Preferably, the thermoplastic elastomer comprises at least one species selected from the group consisting of styrene/butadiene-based elastomers, polyolefin-based elastomers, polyester-based elastomers, polyurethane-based elastomers, poly(vinyl chloride)-based elastomers, polyamide-based elastomers and fluorine-containing elastomers, since these elastomers are excellent in adhesion to the polyamide-based resin, which is to be described later herein.

In accomplishing the first object of the invention, the thermoplastic polymer is preferably a thermoplastic elastomer which makes it easy to secure flexibility and transparency.

In accomplishing the first object of the invention, the thermoplastic elastomer preferably comprises at least one species selected from the group consisting of styrene/butadiene-based elastomers, polyolefin-based elastomers, polyester-based elastomers, polyurethane-based elastomers, poly(vinyl chloride)-based elastomers, and polyamide-based elastomers.

As the styrene/butadiene-based elastomers [SBCs], there may be mentioned, among others, styrene/butadiene/styrene copolymers, styrene/isoprene/styrene copolymers, and styrene/ethylene/butadiene/styrene copolymers. As the polyolefin-based elastomers [TPOs], there may be mentioned polypropylene/polyethylene oxide/polypropylene copolymers and polypropylene/polyolefin-based noncrystalline polymer/polypropylene copolymers, among others. As the polyester-based elastomers [TPEEs], there may be mentioned, for example, polybutylene terephthalate/polyether/polybutylene terephthalate copolymers. As the polyurethane-based elastomers [TPUs], there may be mentioned, for example, ones produced by using a polyester polyol, polyether polyol or polycarbonate polyol as the long-chain diol. As the poly(vinyl chloride)-based elastomers [TPVCs], there may be mentioned, for example, PVC/plasticizer and PVC/rubber blends resulting from partial crosslinking of the PVC thereof. As the polyamide-based elastomers [TPAEs], there may be mentioned nylon 6/polyester copolymers, nylon 6/polyether copolymers, nylon 12/polyester copolymers and nylon 12/polyether copolymers, among others. As the fluorine-containing elastomers, there may be mentioned fluororesin/fluororubber block copolymers and so forth.

The thermoplastic elastomer may comprise one or more of those mentioned above and may further be modified so that the adhesion to nylons may be improved.

The thermoplastic elastomer is preferably a polyurethane-based elastomer since this is excellent in wear resistance and in adhesion to the polyamide resin, which is to be described later herein.

The structure of the polyurethane-based elastomer may be any one that comprises a soft segment comprising polymeric glycol, a hard segment comprising a monomolecular chain extender and an isocyanate. Each segment that can be used in the above polyurethane-based elastomer has a hardness within the range of 65 to 100 as measured on a type A Shore durometer according to ASTM D 2240. A preferred lower limit to the above-mentioned hardness is 75, a more preferred lower limit is 80, a preferred upper limit is 95, and a more preferred upper limit is 90.

In another preferred embodiment, the thermoplastic elastomer is a polyolefin-based elastomer in view of the flexibility thereof, and one having a hardness within the range of 40 to 90 as measured using a type A Shore durometer according to ASTM D 2240. A more preferred range is 45 to 80.

In accomplishing the second object of the invention, the thermoplastic polymer is preferably a fluororesin since this prevents the laminate from changing in size and makes it easy to attain chemical resistance, nonstickiness, elution resistance, antifouling properties and bacteria resistance.

The fluororesin to be used as the thermoplastic polymer is conceptually the same as the resin comprising a fluorine-containing ethylenic polymer, which is to be described later herein. In cases where a fluororesin is used as the thermoplastic polymer and a resin comprising a fluorine-containing ethylenic polymer is used as the thermoplastic resin forming the thermoplastic resin layer (C) to be described later herein, the former fluororesin and the latter fluorine-containing ethylenic polymer may be of the same kind or be different in kind in one laminated resin molding.

In forming the thermoplastic polymer layer (A) in the practice of the invention, the above-mentioned thermoplastic polymer may be used together with at least one additive such as a plasticizer, impact modifier, pigment, inorganic material, carbon black, acetylene black or like electrically conductive material, and/or a resin and/or rubber other than the thermoplastic polymer. The additive and/or resin and/or rubber may be the same as or different from that used in the thermoplastic resin layer (C) and/or polyamide resin layer (A).

The polyamide-based resin, which forms the polyamide-based resin layer (B) in the laminated resin molding of the invention, comprises crystalline polymers having the amide bond [—NHCO—] as a repeating unit within each molecule. As such polyamide-based resin, there may be mentioned, for example, resins consisting of crystalline polymers in which the amide bond is bound to aliphatic structures or alicyclic structures, namely the so-called nylon resins. As the nylon resins, there may be mentioned, for example, nylon 6, nylon 11, nylon 12, nylon 610, nylon 612, nylon 6/66, nylon 66/12, and blends of at least two of these.

The polyamide-based resin may also be one containing a partial structure having no repeating unit amide bond as bound via block or graft bonding. As such polyamide-based resin, there may be mentioned, for example, ones comprising a polyamide resin elastomer such as a nylon 6/polyester copolymer, nylon 6/polyether copolymer, nylon 12/polyester copolymer or nylon 12/polyether copolymer. These polyamide resin elastomers are block copolymers derived from nylon oligomers and polyester oligomers or polyether oligomers via ester or ether bonding. As the polyester oligomers, there may be mentioned, for example, polycaprolactone, polyethylene adipate and the like. As the polyether oligomers, there may be mentioned, for example, polyethylene glycol, polypropylene glycol, and polytetramethylene glycol.

In cases where a thermoplastic elastomer having a low melting point is used as the thermoplastic polymer, the polyamide-based resin should be capable of being coextruded therewith at a relatively low temperature at which the thermoplastic elastomer will not produce any bubbles and, further, the polyamide-based resin layer formed should have a sufficient level of mechanical strength by itself even when it is a thin layer. In these respects, the polyamide-based resin preferably comprises at least one species selected from the group consisting of nylon 6, nylon 11, nylon 12, nylon 610, nylon 612, nylon 6/66, nylon 66/12, nylon 6/polyester copolymers, nylon 6/polyether copolymers, nylon 12/polyester copolymers, nylon 12/polyether copolymers, and blends of two or more of these. Among these, nylon 11, nylon 12 and nylon 612 are more preferred in view of their good flexibility, in particular.

The polyamide-based resin has an amine value of 10 to 60 (equivalents/$10^6$ g). When, in the practice of the invention, the amine value of the polyamide-based resin is selected within the above range, the interlaminar adhesive strength between polyamide-based resin layer (B) and thermoplastic resin layer (C) can be increased even in the case of using, for example, a thermoplastic elastomer as the thermoplastic polymer and carrying out coextrusion at a relatively low temperature such that the thermoplastic elastomer will not foam. When the amine value is lower than 10 (equivalents/$10^6$ g), the interlaminar adhesive strength between the polyamide-based resin layer (B) and thermoplastic resin layer (C) will become insufficient on the occasion of coextrusion at a relatively low temperature at which the thermoplastic elastomer will not foam. When it exceeds 60 (equivalents/$10^6$ g), the laminated resin molding obtained will be unsatisfactory in mechanical strength and, further, tends to discolor during storage, and the handleability will become poor. A preferred lower limit is 15 (equivalents/$10^6$ g), while a preferred upper limit is 50 (equivalents/$10^6$ g) and a more preferred upper limit is 35 (equivalents/$10^6$ g).

The amine value so referred to herein is the value obtained by the amine value measurement method described later herein and, unless otherwise specified, means the amine value of the polyamide-based resin prior to lamination. Among the number of amino groups which the polyamide-based resin before lamination has, some are presumably consumed in adhering to the thermoplastic resin layer (C). Since, however, the number thereof is very small as compared with the whole polyamide-based resin layer (B), the amine value of the polyamide-based resin before lamination and the amine value of the resin in the polyamide-based resin layer (B) are substantially of the same order.

The polyamide-based resin to be used in the practice of the invention preferably has an acid value of not higher than 80 (equivalents/$10^6$ g). Even if the acid value is higher than 80 (equivalents/$10^6$ g), the interlaminar adhesive strength between the polyamide-based resin layer (B) and thermoplastic resin layer (C) as attained by using a thermoplastic elastomer, for instance, as the thermoplastic polymer and carrying out coextrusion at a relatively low temperature such that the thermoplastic elastomer will not foam will be satisfactory so long as the amine value is within the above range. Generally, however, the molecular weight of a polyamide-based resin fairly depends on the amine value and acid value desired or specified and, in this respect, an acid value exceeding 80 (equivalents/$10^6$ g), which may possibly lead to a reduction in the molecular weight of the polyamide-based resin, is undesirable. The acid value is more preferably not higher than 70 (equivalents/$10^6$ g), still more preferably not higher than 60 (equivalents/$10^6$ g). The acid value so referred to herein is the value obtained by the acid value measurement value described later herein.

In the practice of the invention, the melting point of the polyamide-based resin is not particularly restricted but preferably has a melting point of not lower than 130° C. When the melting point is lower than 130° C., the polyamide-based resin layer (B) formed may be poor in mechanical characteristics and/or heat resistance, among others, in certain instances. The preferred upper limit may appropriately be selected according to the heat resistance of the thermoplastic polymer forming the thermoplastic polymer layer (A). A preferred upper limit is 260° C., a more preferred upper limit is 230° C., a still more preferred upper limit is 210° C., and a more preferred lower limit is 150° C. The melting point so referred to herein is given in terms of the value measured on a differential scanning calorimeter [DSC].

When, in the practice of the invention, the polyamide-based resin is used in extrusion molding or blow molding, for instance, the molecular weight thereof as expressed in terms of relative viscosity is preferably not lower than 1.8. If it is lower than 1.8, the moldability in such molding as mentioned above will be inferior and the mechanical strength of the laminated resin molding may decrease in certain instances. More preferably, it is not lower than 2.0. On the other hand, the upper limit is preferably set at 4.0. When it exceeds 4.0, it is difficult to obtain the polyamide-based resin itself by polymerization and, in certain instances, reduced moldability on the occasion of molding thereof may result. The relative viscosity is measured in accordance with JIS K 6810.

In forming the polyamide-based resin layer (B), the polyamide-based resin may also be used together with a plasticizer and/or some resin other than the polyamide-based resin in such an amount as not to be contrary to the object of the invention. The plasticizer can improve the flexibility of the polyamide-based resin layer (B) formed and, in particular, can improve the low-temperature mechanical characteristics of the laminated resin molding.

The plasticizer is not particularly restricted but includes, among others, hexylene glycol, glycerol, β-naphthol, dibenzylphenol, octylcresol, bisphenol A, octyl p-hydroxybenzoate, 2-ethylhexyl p-hydroxybenzoate, heptyl p-hydroxybenzoate, p-hydroxybenzoic acid-ethylene oxide and/or propylene oxide adducts, octyl p-hydroxybenzoate, 2-ethylhexyl p-hydroxybenzoate, heptyl p-hydroxybenzoate, ϵ-caprolactone, phosphate esters of phenols, N-methylbenzenesulfonamide, N-ethylbenzenesulfonamide, N-butylbenzenesulfonamide, toluenesulfonamide, N-ethyltoluenesulfonamide, and N-cyclohexyltoluenesulfonamide.

The shock resistance of the laminated resin molding can be improved by using the polyamide-based resin together with some resin other than the polyamide-based resin to form the polyamide-based resin layer (B). Preferred as the other resin to be used together with the polyamide-based resin to form the polyamide-based resin layer (B) are those having good compatibility with the polyamide-based resin, including, among others, ester- and/or carboxylic acid-modified olefin resins; acrylic resins, in particular glutarimide group-containing acrylic resins; ionomer resins; polyester resins; phenoxy resins; ethylene/propylene/diene copolymers; and polyphenylene oxide. As the ester- and/or carboxylic acid-modified olefin resins, there may be mentioned, for example, ethylene/methyl acrylate copolymers, ethylene/acrylate copolymers, ethylene/methyl acrylate/maleic anhydride copolymers, ethylene/ethyl acrylate copolymers, and propylene/maleic anhydride copolymers.

The polyamide-based resin layer (B) can also be formed by using the polyamide-based resin together with a colorant and/or one or more of various additives each used in such an amount as not to be contrary to the object of the invention. As the additives, there may be mentioned, for example, antistatic agents, flame retardants, heat stabilizers, ultraviolet absorbers, lubricants, mold release agents, nucleating agents, and reinforcing agents (fillers).

The thermoplastic resin to form the thermoplastic resin layer (C) in the laminated resin molding of the invention may be any of those generally recognized as thermoplastic resins. Preferably, however, the thermoplastic resin comprises a fluorine-containing ethylenic polymer. Unless otherwise specified, the term "thermoplastic resin" as used hereinafter means that one used for forming the thermoplastic resin layer (C), which may be the same or different in kind as or from the thermoplastic polymer forming the thermoplastic polymer layer (A) but is different from the polyamide-based resin forming the polyamide-based resin layer (B).

The above-mentioned thermoplastic resin contains a functional group and is to thereby firmly adhere to the polyamide-based resin forming the polyamide-based resin layer (B) by thermal fusion bonding. Without any functional group, the interlaminar adhesive strength will be so low that delamination may occur during use; this is a problem from the practical viewpoint. The phrase "to firmly adhere" as used above means that the initial adhesive strength between the polyamide-based resin layer (B) and thermoplastic resin layer (C) in the laminated resin molding of the invention as laminated by thermal fusion bonding is not lower than 25 N/cm. When it is lower than 25 N/cm, delamination may occur between the polyamide-based resin layer (B) and thermoplastic resin layer (C). The initial adhesive strength between the polyamide-based resin layer (B) and thermoplastic resin layer (C) may be not higher than 60 N/cm, for instance, provided that it is not lower than 25 N/cm.

Therefore, the above-mentioned thermoplastic resin is required to be a functional group-containing one so that firm adhering thereof to the polyamide-based resin layer (B) may be established by thermal fusion bonding. This functional group may be any one that can be involved in the adhering to the polyamide-based resin forming the polyamide-based resin layer (B). The group capable of being involved in the adhering to the polyamide-based resin forming the polyamide-based resin layer (B) is hereinafter referred to as "adhesive functional group". In the practice of the invention, the thermoplastic resin is an adhesive functional group-containing one. The adhesive functional group so referred to herein is practically a group capable of coordinating or reacting with a group, such as an amide bond or amino group, which the crystalline polymer constituting the polyamide-based resin and includes, within the meaning thereof, not only those groups which are generally referred to as functional groups but also those groups which are generally referred to as bonds, such as ester bonds, on condition that they have such coordinating or reacting ability as mentioned above. The groups generally referred to as bonds are present on side chains or in the main chain of the polymer in the thermoplastic resin.

By saying that "the thermoplastic resin is an adhesive functional group-containing one", it is meant that while the thermoplastic resin generally comprises a polymer, the polymer is an adhesive functional group-containing one.

The number of the adhesive functional groups which the thermoplastic resin has can be appropriately selected according to counterpart material for lamination, shape and form, purpose of adhesion, intended use, required adhesive strength, thermoplastic resin species and differences in method of adhesion, among others. Preferably, the number of adhesive functional groups is 3 to 1000 per $1 \times 10^6$ main chain carbon atoms of the polymer in the thermoplastic resin. When it is less than 3, the interlaminar adhesive strength between polyamide-based resin layer (B) and thermoplastic resin layer (C) may be insufficient in certain instances. When it exceeds 1000, a gas generated as a result of a chemical change of the adhesive functional group on the occasion of adhesion and entering the adhesion interface adversely affects the adhesion, reducing the interlaminar adhesive strength between the polyamide-based resin layer (B) and thermoplastic resin layer (C) in certain instances. As for the number of adhesive functional groups, a more preferred lower limit thereto is 10, a more preferred upper limit is 500, and a still more preferred upper limit is 300, per $1 \times 10^6$ main chain carbon atoms in the polymer in the thermoplastic resin. The number of functional groups so referred to herein is the value obtained by infrared spectral analysis as mentioned later herein and, unless otherwise specified, it means the number of functional groups which the polymer in the thermoplastic resin before lamination has.

As the adhesive functional group, there may be mentioned, for example, groups containing a carbonyl group. The carbonyl group-containing groups, there may be mentioned carbonyl, carbonate, haloformyl, formyl, carboxyl, ester, acid anhydride [—C(=O)O—C(=O)—], and isocyanato groups or bonds, among others. On the contrary, amide [—C(=O)—NH—], imide [—C(=O)—NH—C(=O)—], urethane [—NH—C(=O)O—], urea [—NH—C(=O)—NH—] and like groups or bonds, which also contain [—C(=O)—], unlike such ones enumerated hereinabove as carbonyl and carbonate groups, are poor in reactivity and, essentially, are incapable of reacting with the group or groups in the crystalline polymer constituting the polyamide-based resin, which forms the polyamide-based resin layer (B). Therefore, as far as the present invention is concerned, at least the amide, imide, urethane or urea group or bond is not included under the category of carbonyl group-containing groups. Preferred as the carbonyl group-containing group are carbonate groups and haloformyl groups, because of the ease of introduction thereof and the high reactivity thereof with the group or groups which the crystalline polymer constituting the polyamide-based resin has.

The carbonate groups are groups comprising the bond generally represented by —OC(=O)O— and are represented by —OC(=O)O—R (in which R represents an organic group or a group VII atom, wherein the organic group is, for example, a $C_1$ to $C_{20}$ alkyl group, on particular a $C_1$ to $C_{10}$ alkyl group, or an ether bond-containing $C_2$ to $C_{20}$ alkyl group). As preferred examples of the carbonate group, there may be mentioned, for example, —OC(=O)OCH$_3$, —OC(=O)OC$_3$H$_7$, —OC(=O)OC$_8$H$_{17}$ and —OC(=O)OCH$_2$CH$_2$CH$_2$OCH$_2$CH$_3$.

The haloformyl groups are represented by —COY (in which Y represents a group VII atom) and include —COF and —COCl, among others.

The thermoplastic resin to be used in the practice of the invention is an adhesive functional group-containing one, and each adhesive functional group may be bound either to a terminus of the polymer in the thermoplastic resin or to a side chain. When the adhesive functional group is a carbonyl group-containing group and the carbonyl group is a part of a carbonate group and/or haloformyl group, the thermoplastic resin includes:

(1) thermoplastic resins containing the carbonate group alone at a terminus or termini or on at least one side chain;

(2) thermoplastic resins containing the haloformyl group alone at a terminus or termini or on at least one side chain; and (3) thermoplastic resins containing both the carbonate group and haloformyl group each at a terminus or termini or on at least one side chain, and may be any one of these. Among them, those having an adhesive functional group at a terminus or termini are preferred because they will not markedly reduce the heat resistance, mechanical characteristics or chemical resistance and because they are advantageous from the productivity and cost viewpoint.

In the thermoplastic resin mentioned above, there may be present some adhesive functional group-free polymer molecules on condition that other polymer molecules present therein are molecules containing such an adhesive functional group or groups as mentioned above.

The specific species to be used as the thermoplastic resin mentioned above is to be appropriately selected according to the purpose, use, method of use, the resin species forming the thermoplastic polymer layer (A) and polyamide-based resin layer (B). Preferably, the thermoplastic resin has a melting point of 160 to 240° C. When the melting point of the thermoplastic resin is within this range, good adhesion is attained between the adhesive functional group(s) and the group(s) which the crystalline polymer in the polyamide-based resin forming the polyamide-based resin layer (B) contains, the moldability is good and, further, the transparency of the thermoplastic resin layer (C) is favorably improved by carrying out coextrusion at a temperature adapted to the melting point of the thermoplastic resin and lying within the range mentioned above. A preferred upper limit is 220° C.

The polymer in the thermoplastic resin is not particularly restricted but is preferable a fluorine-containing ethylenic polymer. The fluorine-containing ethylenic polymer has those excellent characteristics intrinsic in fluororesins, for example chemical resistance, solvent resistance, weather resistance, antifouling properties, nonstickiness and bacteria resistance, and can provide the laminated resin molding obtained with such excellent characteristics. The fluorine-containing ethylenic polymer is the product of polymerization of at least one fluorine-containing ethylenic monomer. It may be the product of polymerization of a fluorine-containing ethylenic monomer and a fluorine-free ethylenic monomer. The fluorine-containing ethylenic monomer and fluorine-free ethylenic monomer each may comprise one single or two or more species.

The fluorine-containing ethylenic monomer is an olefinic unsaturated monomer containing one or more fluorine atoms but having no adhesive functional group and includes, among others, tetrafluoroethylene, vinylidene fluoride, chlorotrifluoroethylene, vinyl fluoride, hexafluoropropylene, hexafluoroisobutene, monomers represented by the general formula (1):

$$CH_2=CX^1(CF_2)_nX^2 \qquad (1)$$

wherein $X^1$ represents H or F, $X^2$ represents H, F or Cl and n represents an integer of 1 to 10, and perfluoro(alkyl vinyl ether) species.

The fluorine-free ethylenic monomer mentioned above is an olefinic unsaturated monomer containing neither fluorine atom nor adhesive functional group and, from the viewpoint of no risk of weakening the heat resistance or chemical resistance of the product fluorine-containing ethylenic polymer, among others, preferably is an ethylenic monomer containing not more than 5 carbon atoms, for example ethylene, propylene, 1-butene, 2-butene, vinyl chloride or vinylidene chloride.

In preparing the fluorine-containing ethylenic polymer by polymerization of a fluorine-containing ethylenic monomer and a fluorine-free ethylenic monomer, the monomer composition may be such that the fluorine-containing ethylenic monomer amounts to 10 to 100 mole percent and the fluorine-free ethylenic monomer to 0 to 90 mole percent. A preferred lower limit to the proportion of the fluorine-containing ethylenic monomer is 30 mole percent, and a preferred upper limit to the proportion of the fluorine-containing ethylenic monomer is 70 mole percent. When the fluorine-containing ethylenic monomer proportion is smaller than 10 mole percent, the resulting fluorine-containing ethylenic polymer will fail to acquire the fluororesin-specific characteristics and, therefore, such a proportion is undesirable.

The monomer composition expressed herein in terms of "mole percent" indicates the proportions, in the polymer, of the respective monomers added and is expressed in terms of the mole fractions of the respective monomers added to form the polymer.

By selecting the fluorine-containing ethylenic monomer and fluorine-free ethylenic monomer species and the combination and proportions thereof, it is possible to adjust the melting point or glass transition point of the product fluorine-containing ethylenic polymer, and the fluorine-containing ethylenic polymer can be obtained either in a resin form or in an elastomer form. The properties of the fluorine-containing ethylenic polymer can be adequately selected according to the object and use of the adhesion and the purpose and use of the product laminated resin molding.

The fluorine-containing ethylenic polymer preferably has a molecular weight within the range within which the fluorine-containing ethylenic polymer can be molded at a temperature below the thermal decomposition temperature thereof and, in addition, the laminated resin molding obtained can manifest those good mechanical characteristics, chemical resistance and other properties intrinsic in the fluorine-containing ethylenic polymer. When the melt flow rate [MFR] is employed as a molecular weight index, the MFR at a temperature within the range of about 230 to 350° C., which is the molding temperature range for common fluororesins, is preferably 0.5 to 100 g/10 minutes. More preferably, the MFR at a temperature of 265° C. is 1 to 50 g/10 minutes. The MFR so referred to herein is the value obtained by the MFR measurement method to be described later herein.

The fluorine-containing ethylenic polymer to be used in the practice of the invention is preferably one excellent in transparency, most preferably one showing, in the form of a 500-μm-thick film, a total luminous transmittance of at least 85%.

Preferred as the fluorine-containing ethylenic polymer to be used in the practice of the invention are tetrafluoroethylene unit-based, fluorine-containing ethylenic polymers in view of their good heat resistance and chemical resistance as well as vinylidene fluoride unit-based, fluorine-containing ethylenic polymers in view of their good moldability. The term "unit" as used herein denotes that moiety derived from each monomer molecule which is a part of the molecular structure of the polymer.

When the polymer in the thermoplastic resin is a fluorine-containing ethylenic polymer, the adhesive functional group may be found at a terminus or termini or on a side chain(s) of the fluorine-containing ethylenic polymer. When the adhesive functional group is bound to a polymer terminus or termini, the fluorine-containing ethylenic polymer can be obtained, for example, by the method comprising using such a polymerization initiator as a peroxide, which will be described later herein, and, when the adhesive functional group is bound to a side chain(s), it can be obtained by copolymerizing an adhesive functional group-containing ethylenic monomer and the above-mentioned fluorine-containing ethylenic monomer and/or fluorine-free ethylenic monomer, as will be described later herein. The "adhesive functional group-containing ethylenic monomer" is an olefinically unsaturated monomer having an adhesive functional group. The adhesive functional group-containing ethylenic monomer may contain a fluorine atom(s) or be fluorine-free but does not conceptually include either of the "fluorine-containing ethylenic monomer" and "fluorine-free ethylenic monomer" mentioned above.

As some preferred specific examples of the fluorine-containing ethylenic polymer to be used in the practice of the invention, there may be mentioned those fluorine-containing ethylenic polymers (I)-(V) which are the fluorine-containing ethylenic polymers obtained by polymerizing the monomer(s) specified below and are excellent in heat resistance, chemical resistance, weather resistance, electrical insulating quality and nonstickiness. The monomer composition of each fluorine-containing ethylenic polymer as reported herein is given in terms of values with the sum of monomers other than the adhesive functional group-containing ethylenic monomer as copolymerized in obtaining the fluorine-containing ethylenic polymer having an adhesive functional group(s) on a side chain(s) being taken as 100 mole percent.

(I) Copolymers obtained by polymerizing tetrafluoroethylene and ethylene;
(II) Copolymers obtained by polymerizing at least tetrafluoroethylene and a compound represented by the general formula (ii):

$$CF_2=CF-Rf^1 \quad (ii)$$

wherein $Rf^1$ represents $CF_3$ or $ORf^2$ (in which $Rf^2$ represents a perfluoroalkyl group containing 1 to 5 carbon atoms);
(III) Polymers obtained by polymerizing at least vinylidene fluoride;
(IV) Copolymers derived from at least the following a, b and c:
a. 20 to 89 mole percent (a preferred upper limit being 70 mole percent) of tetrafluoroethylene,
b. 10 to 79 mole percent (a preferred lower limit being 20 mole percent and a preferred upper limit being 60 mole percent) of ethylene, and
c. 1 to 70 mole percent (a preferred upper limit being 60 mole percent) of a compound represented by the general formula (ii):

$$CF_2=CF-Rf^1 \quad (ii)$$

wherein $Rf^1$ represents $CF_3$ or $ORf^2$ (in which $Rf^2$ represents a perfluoroalkyl group containing 1 to 5 carbon atoms); and
(V) Copolymers derived from at least the following d, e and f:
d. 15 to 60 mole percent of vinylidene fluoride,
e. 35 to 80 mole percent of tetrafluoroethylene, and
f. 5 to 30 mole percent of hexafluoropropylene.

Among them, the copolymers (IV) are preferred as the fluorine-containing ethylenic polymer since they can give laminated resin moldings excellent in transparency.

As the copolymers (I), there may specifically be mentioned, among others, copolymers constituted at least of 20 to 89 mole percent of tetrafluoroethylene, 10 to 79 mole percent of ethylene and 0 to 70 mole percent of a monomer copolymerizable with these. A preferred upper limit to the tetrafluoroethylene content is 60 mole percent, and a preferred upper limit to the ethylene content is 60 mole percent and a preferred lower limit thereto is 20 mole percent.

As the monomer copolymerizable with tetrafluoroethylene and ethylene, there may be mentioned hexafluoropropylene, chlorotrifluoroethylene, monomers represented by the general formula (i) given above, perfluoro(alkyl vinyl ether) species, and propylene, among others. Generally, one or two or more of these are used.

Such fluorine-containing ethylenic polymers as the copolymers (I) mentioned above are especially excellent in heat resistance, chemical resistance, weather resistance, electrical insulating quality, nonstickiness, gas barrier properties, elution resistance, and bacteria resistance.

Among the copolymers (I) mentioned above, the following, among others, are preferred since they retain those excellent performance characteristics of tetrafluoroethylene/ethylene copolymers, their melting point can be reduced to a relatively low level and the adhesion properties thereof can be made the most of against the counterpart material in lamination:
(I-1) Copolymers derived at least from 62 to 80 mole percent of tetrafluoroethylene, 20 to 38 mole percent of ethylene and 0 to 10 mole percent of a monomer copolymerizable with tetrafluoroethylene and ethylene; and
(I-2) Copolymers derived at least from 20 to 80 mole percent of tetrafluoroethylene, 10 to 80 mole percent of ethylene, 0 to 30 mole percent of hexafluoropropylene and 0 to 10 mole percent of a monomer copolymerizable with tetrafluoroethylene and ethylene.

Preferred as the copolymers (II) are, for example, the following:
(II-1) Copolymers derived at least from 65 to 95 mole percent of tetrafluoroethylene and 5 to 35 mole percent of hexafluoropropylene; preferably, copolymers derived from at least 75 mole percent of tetrafluoroethylene and at most 25 mole percent of hexafluoropropylene;
(II-2) Copolymers derived at least from 70 to 97 mole percent of tetrafluoroethylene and 3 to 30 mole percent of a monomer represented by $CF_2=CFORf^2$ (in which $Rf^2$ represents a perfluoroalkyl group containing 1 to 5 carbon atoms); and
(II-3) Copolymers resulting from polymerization of at least tetrafluoroethylene, hexafluoropropylene and a monomer represented by $CF_2=CFORf^2$ (in which $Rf^2$ is as defined above), with the sum of hexafluoropropylene and the monomer represented by $CF_2=CFORf^2$ being 5 to 30 mole percent.

The copolymers (II-2) and (II-3) mentioned above are perfluoro-based copolymers and are particularly excellent in heat resistance, chemical resistance, water repellency, nonstickiness, electrical insulating quality, barrier properties, elution resistance and bacteria resistance, among others.

As the copolymers (III), there may be mentioned, among others, copolymers derived at least from 15 to 99 mole percent of vinylidene fluoride, 0 to 80 mole percent of tetrafluoroethylene and 0 to 30 mole percent of at least one of hexafluoropropylene and chlorotrifluoroethylene.

Thus, there may be mentioned, among others, the following:
(III-1) Copolymers derived at least from 30 to 99 mole percent of vinylidene fluoride and 1 to 70 mole percent of tetrafluoroethylene;
(III-2) Copolymers derived at least from 60 to 90 mole percent of vinylidene fluoride, 0 to 30 mole percent of tetrafluoroethylene and 1 to 20 mole percent of chlorotrifluoroethylene;
(III-3) Copolymers derived at least from 60 to 95 mole percent of vinylidene fluoride, 0 to 30 mole percent of tetrafluoroethylene and 5 to 30 mole percent of hexafluoropropylene; and
(III-4) Copolymers derived at least 15 to 60 mole percent of vinylidene fluoride, 35 to 80 mole percent of tetrafluoroethylene and 5 to 30 mole percent of hexafluoropropylene.

The method of producing the fluorine-containing ethylenic polymer to be used in the practice of the invention is not particularly restricted. When a fluorine-containing ethylenic polymer having adhesive functional groups on side chains, as mentioned above, is to be produced, the desired polymer can be obtained by copolymerizing an adhesive functional group-containing ethylenic monomer with one or more fluorine-containing ethylenic monomer and a fluorine-free ethylenic monomer each adapted in kind and in proportion for the production of the desired fluorine-containing ethylenic polymer. When the adhesive functional group is a carbonyl group-containing group, preferred adhesive function group-containing ethylenic monomers are perfluoroacryloyl fluoride, 1-fluoroacryloyl fluoride, acryloyl fluoride, 1-trifluoromethacryloyl fluoride, perfluorobutenoic acid or like fluorine-containing monomers; and acrylic acid, methacrylic acid, acryloyl chloride, vinylene carbonate and like fluorine-free monomers.

For obtaining fluorine-containing ethylenic polymers having an adhesive functional group at one or each terminus of the polymer, various methods can be employed. When the adhesive functional group is a carbonyl group-containing group, the method comprising polymerizing the monomer or monomers which are to constitute the fluorine-containing ethylenic polymer, using a peroxide, in particular a peroxycarbonate or peroxy ester, as the polymerization initiator can be preferably employed from the economical viewpoint and from the viewpoint of such quality features as heat resistance and chemical resistance. By this method, it is possible to introduce a peroxide-derived carbonyl group, for example a peroxycarbonate-derived carbonate group or a peroxy ester-derived ester group, or a group derived from such a functional group by conversion thereof, for example a haloformyl group, into a polymer terminus. Among such polymerization initiators, a peroxycarbonate is preferably used since the polymerization temperature can be lowered and the initiation reaction will not be accompanied by any side reaction.

Preferred as the peroxycarbonate are compounds represented by one of the general formulas (1) to (4):

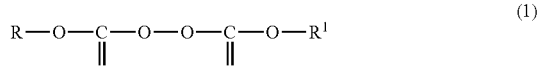
(1)

(2)

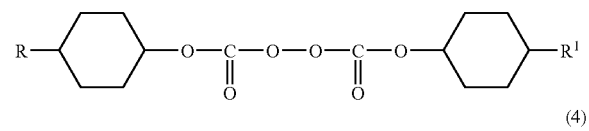
(3)

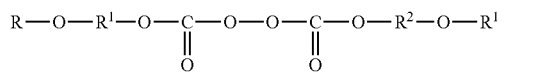
(4)

In the above formulas, R and $R^1$ are the same or different and each represent a straight or branched univalent saturated hydrocarbon group containing 1 to 15 carbon atoms or a straight or branched, alkoxyl group-terminated, univalent saturated hydrocarbon group containing 1 to 15 carbon atoms, and $R^2$ represents a straight or branched bivalent saturated hydrocarbon group containing 1 to 15 carbon atoms or a straight or branched, alkoxyl group-terminated, bivalent saturated hydrocarbon group containing 1 to 15 carbon atoms.

Preferred as the peroxycarbonate are, among others, diisopropyl peroxycarbonate, di-n-propyl peroxydicarbonate, tert-butyl peroxyisopropyl carbonate, bis(4-tert-butylcyclohexyl) peroxydicarbonate, and di-2-p-ethylhexyl peroxydicarbonate.

The dosage of the polymerization initiator such as a peroxycarbonate or peroxy ester may vary depending on the species, composition and molecular weight of the desired fluorine-containing ethylenic polymer, the polymerization conditions and the initiator species employed, among others. Preferably, however, the initiator is used in an amount of 0.05 to 20 parts by mass per 100 parts by mass of the fluorine-containing ethylenic polymer to be obtained. A more preferred lower limit is 0.1 part by mass, and a more preferred upper limit is 10 parts by mass.

The method of polymerization is not particularly restricted but includes, for example, solution polymerization, suspension polymerization, emulsion polymerization and bulk polymerization. Preferred from the industrial viewpoint is the suspension polymerization in an aqueous medium in which a fluorine-containing solvent is used and a peroxycarbonate or the like is used as the polymerization initiator. In the suspension polymerization, a fluorine-containing solvent can be used in admixture with water. As the fluorine-containing solvent to be used in the suspension polymerization, there may be mentioned hydrochlorofluoroalkanes such as $CH_3CClF_2$, $CH_3CCl_2F$, $CF_3CF_2CCl_2H$ and $CF_2ClCF_2CFHCl$; chlorofluoroalkanes such as $CF_2ClCFClCF_2CF_3$ and $CF_3CFClCFClCF_3$; and perfluoroalkanes such as perfluorocyclobutane, $CF_3CF_2CF_2CF_3$, $CF_3CF_2CF_2CF_2CF_3$ and $CF_3CF_2CF_2CF_2CF_2CF_3$, for instance. Among them, perfluoroalkanes are preferred. The fluorine-containing solvent is preferably used in an amount of 10 to 100% by mass relative to water from the viewpoint of suspensibility and economy.

The polymerization temperature is not particularly restricted but may be within the range of 0 to 100° C. The polymerization pressure is to be adequately selected depending on the solvent species employed, the amount and vapor pressure thereof, the polymerization temperature and other polymerization conditions and, generally, it may be within the range of 0 to 9.8 MPaG.

For molecular weight adjustment, a conventional chain transfer agent, for example, a hydrocarbon such as isopentane, n-pentane, n-hexane or cyclohexane; an alcohol such as methanol or ethanol; or a halogenated hydrocarbon such as carbon tetrachloride, chloroform, methylene chloride or methyl chloride, can be used. The terminal carbonate or ester group content can be controlled by modifying the polymerization conditions such as the peroxycarbonate or peroxy ester dosage, chain transfer agent dosage and polymerization temperature.

Various methods can be employed for obtaining haloformyl group-terminated fluorine-containing ethylenic polymers. For example, they can be obtained by heating the carbonate or ester group-terminated fluorine-containing ethylenic polymer mentioned above to effect thermal degradation (decarboxylation). The heating temperature varies depending on the carbonate or ester group species and the fluorine-containing ethylenic polymer species, among others. It is desirable that the polymer itself be heated to a temperature of 270° C. or above, preferably 280° C. or above, more preferably 300° C. or above but lower than the thermal decomposition temperature of the moieties of the fluorine-containing ethylenic polymer other than the carbonate or ester groups, hence, more preferably to 400° C. or below, still more preferably 350° C. or below.

The thermoplastic resin layer (C) is preferably one formed by melt extrusion of the thermoplastic resin, more preferably one formed by melt extrusion of the above-mentioned fluorine-containing ethylenic polymer. As described above, the haloformyl group may be degraded to a carboxyl group upon heating in the process of melt extrusion of the fluorine-containing ethylenic polymer, for instance, or with the lapse of time and, therefore, the carbonyl group content in the thermoplastic resin layer (C) is preferably 3 to 1000 groups per $1 \times 10^6$ main chain carbon atoms in the fluorine-containing ethylenic polymer and the carbonyl group may be a part of the carbonate group, a part of the haloformyl group and/or a part of the carboxyl group.

The thermoplastic resin layer (C) in the laminate of the invention may contain one or more other components or ingredients incorporated therein, if necessary. Preferably, the layer is made of the above-mentioned fluorine-containing ethylenic polymer and one or more other components/ingredients incorporated in that polymer according to need. While the fluorine-containing ethylenic polymer is preferably used singly so long as the adhesiveness, heat resistance, chemical resistance and other characteristics of the polymer itself will not be impaired, the thermoplastic resin layer (C) can also be formed using that polymer together with one or more of arbitrary additives, for example various fillers such as inorganic powders, glass fibers, carbon fibers, metal oxides and carbon species, pigments, and ultraviolet absorbers, within limits within which the performance characteristics thereof as required for the destination and intended use thereof will not be adversely affected. For the purpose of improving the mechanical characteristics, improving the weather resistance, providing an artistic design, reducing static electrical charges or improving the moldability, it is also possible to further use, with or without the additives, fluororesins other than the resins comprising the above-mentioned fluorine-containing ethylenic polymers, thermoplastic resins other than the polyamide-based resins for forming the polyamide-based resin layer (B) and other than the resins comprising the fluorine-containing ethylenic polymers, thermosetting resins, synthetic rubbers, etc. The combined use of an electrically conductive material such as carbon black or acetylene black is advantageously effective in preventing static electricity from accumulating when the laminated resin molding obtained is used as a fuel piping tube or a fuel piping hose.

The thermoplastic resin layer (C) may be an electrically conductive one according to need. The term "electrically conductive" is used herein to mean that while continuous contacting of an inflammable fluid such as gasoline with an electrical insulator such as a resin may result in static electricity accumulation, hence possibly in inflammation, the resin layer has electrical characteristics such that such static electricity accumulation can be prevented. According to the definition in the standard SAEJ 2260, for instance, electrical conductivity corresponds to a surface resistance of not higher than $10^6 \Omega/\square$. The level of addition of the electrically conductive material in rendering the thermoplastic resin layer (C) electrically conductive is preferably not higher than 20% by mass, more preferably not higher than 15% by mass, relative to the sum of the resin(s) and optional component(s)/ingredient(s) forming the thermoplastic resin layer (C). The lower limit may be at such a level that the layer (C) can be provided with the above-mentioned surface resistance.

As described hereinabove, the polyamide-based resin layer (B) in the laminated resin molding of the invention is formed out of a polyamide-based resin having an amine value within the specified range and the thermoplastic resin layer (C) is formed out of an adhesive function group-containing, preferably carbonyl group-containing, thermoplastic resin and, therefore, the polyamide-based resin layer (B) and the thermoplastic resin layer (C) are firmly adhered together by thermal fusion bonding. The amide bonds in the polyamide-based resin forming the polyamide-based resin layer (B) and the adhesive functional groups in the thermoplastic resin forming the thermoplastic resin layer (C), upon heating, react with each other or interact with each other in the manner of coordination, for instance, whereby the firm adhesion between the polyamide-based resin layer (B) and the thermoplastic resin layer (C) can be obtained.

Further, as described hereinabove, the thermoplastic resin layer (C) in the laminated resin molding of the invention is formed out of a thermoplastic resin capable of sufficiently adhering to the polyamide-based resin through functional groups and, therefore, the thermoplastic resin (C) and the polyamide-based resin layer (B) are firmly adhered together.

Accordingly, the thermoplastic polymer layer (A), polyamide-based resin layer (B) and thermoplastic resin layer (C) in the laminated resin molding of the invention are firmly adhered together. The phrase "firmly adhered together" as used herein means that the initial adhesive strength between the thermoplastic polymer layer (A) and polyamide-based resin layer (B) and the initial adhesive strength between the polyamide-based resin layer (B) and thermoplastic resin layer (C) each shows a value within the range given hereinabove.

The laminated resin molding of the invention is obtained, for example, by the method comprising the thermoplastic polymer layer (A), polyamide-based resin layer (B) and thermoplastic resin layer (C) by sequential extrusion or coextrusion, or by the method comprising subjecting the molded layers to contact bonding with heating under pressure. By using such method, it is possible to attain a sufficient level of interlaminar adhesive strength between the thermoplastic polymer layer (A) and polyamide-based resin layer (B) and between the polyamide-based resin layer (B) and thermoplastic resin layer (C). The laminated resin molding can be produced using any of the conventional thermoplastic resin molding machines, such as injection molding machines, compression molding machines, blow molding machines, extrusion molding machines, etc. Thus, laminated resin moldings in various forms such as sheet-like or tube-like forms can be obtained. In producing the laminated resin molding in the form of a multilayer molded article, for example a multilayer tube, multilayer hose or multilayer tank, such a molding method as multilayer coextrusion molding, multilayer blow molding or multilayer injection molding can be applied. Among them, the technique of extrusion molding, in particular simultaneous multilayer coextrusion molding, is preferably used in molding tubes, hoses and sheets, among others, while the blow molding technique can be suitably used in molding hollow articles having a cylindrical form, for instance. It is also possible to produce lined materials by laminating the molded sheet with some other substrate.

As regards the simultaneous multilayer coextrusion molding and blow molding conditions, the multilayer die temperature is set at such a level that the thermoplastic polymer will not be deteriorated or will not foam and that the interlaminar adhesive strength between the polyamide-based resin layer (B) and thermoplastic resin layer (C) may become satisfactory. Broadly, the multilayer die temperature is not higher than 300° C. and, for accomplishing the first object of the invention, that temperature is preferably set at 250° C. or below, more preferably at 230° C. or below, still more preferably at 220° C. or below. For achieving the second object of the invention, it is preferably set at a level exceeding 250° C. but not higher than 300° C., more preferably at a level not lower than 260° C. but not higher than 290° C. The lower limit to the multilayer die temperature is set at that melting point of the polyamide-based resin for forming the polyamide-based resin layer (B) or of the thermoplastic resin for forming the thermoplastic resin layer (C), whichever is lower. As for the cylinder temperature, a temperature higher by 10 to 50° C. than the melting points of the resins for forming the respective layers is appropriate.

The laminated resin molding may be a laminate comprising the thermoplastic polymer layer (A), polyamide-based resin layer (B) and thermoplastic resin layer (C) alone, or a laminate further comprising one or more layers other than the thermoplastic polymer layer (A), polyamide-based resin layer (B) and thermoplastic resin layer (C).

The other layer may be a glass fiber layer for reinforcement or a braid layer made of a polyester or a like resin.

In cases where the thermoplastic polymer layer (A) and thermoplastic resin layer (C) are in contact with the polyamide-based resin layer (B) in the laminated resin molding, the polyamide-based resin layer (B) may comprise two polyamide-based resin layers, namely a polyamide-based resin layer (B1) and a polyamide-based resin layer (B2) with at least one other layers (E) sandwiched between the layers (B1) and (B2). In this case, the laminated resin molding is constituted of the thermoplastic polymer layer (A), polyamide-based resin layer (B1), other layer (E), polyamide-based resin layer (B2) and thermoplastic resin layer (C), hence is a laminate resulting from lamination of those five layers in that order (hereinafter sometimes referred to as "laminated resin molding P").

The resin for forming the other layer (E) can be selected from among those thermoplastic polymer species mentioned hereinabove. The cost of the laminated resin molding P can be reduced by using a low-priced general-purpose resin in forming the other layer (E) and thus substituting that low-priced resin for a part of the polyamide-based resin which is generally high-priced. Further, by increasing the thickness of the other layer (E), it is possible to make the laminate thick in response to the intended use while suppressing the increase in cost. By using a thermoplastic polymer higher in flexibility than the polyamide-based resin in forming the other layer (E), the flexibility of the laminated resin molding P as a whole can be adjusted in response to the intended use.

The laminate structure of the laminated resin molding P is an appropriate one also in cases where the thermoplastic resin polymer forming the thermoplastic polymer layer (A) and the thermoplastic resin forming the thermoplastic resin layer (C) are similar or the same in kind, in particular when each of them is a resin comprising a fluorine-containing ethylenic polymer; no trouble will be encountered in accomplishing the second object of the invention. In attaining the second object of the invention, the thermoplastic resin polymer and the thermoplastic resin layer in the laminated resin molding P are preferably made of the same resin comprising a fluorine-containing ethylenic polymer, more preferably the copolymer (IV) mentioned hereinabove in view of the ease of preparation, among others, while, in forming the other layer (E), a relatively low-priced thermoplastic polymer is preferred and polyethylene or a like polyolefin resin or a modified polyolefin resin is more preferred.

In the practice of the invention, the thermoplastic resin layer (C) may be further adhered to a layer (D) comprising a fluororesin in the manner of lamination. If necessary, the fluororesin layer (D) may contain an electrically conductive material for providing electrical conductivity. In this case, the conductive material is used at an addition level sufficient to provide electrical conductivity, and the addition level may be the same as described hereinabove referring to the thermoplastic resin layer (C).

The fluororesin mentioned above is not particularly restricted but may be any of those fluororesins capable of being melt molded, including, among others, tetrafluoroethylene/fluoro(alkyl vinyl ether) copolymers [PFAs], tetrafluoroethylene/hexafluoropropylene copolymers [FEPs], ethylene/tetrafluoroethylene copolymers [ETFEs], polychlorotrifluoroethylene [PCTFE], ethylene/chlorotrifluoroethylene copolymers [ECTFEs]. It may be one of the fluorine-containing ethylenic polymers mentioned hereinabove.

The laminated resin molding of the invention may further comprise a thermoplastic polymer layer (F) as bonded to the thermoplastic polymer layer (A) in the manner of lamination. In attaining the first object of the invention, the thermoplastic polymer forming the thermoplastic polymer layer (A) and the thermoplastic polymer forming the thermoplastic polymer layer (F) in the laminated resin molding of the invention each preferably comprises a thermoplastic elastomer, and the thermoplastic polymer is preferably selected so that the thermoplastic polymer layer (A) and thermoplastic polymer layer (F) may be firmly adhered to each other. The thermoplastic polymer forming the thermoplastic polymer layer (A) and the thermoplastic polymer forming the thermoplastic polymer layer (F) may be of the same kind or different in kind. When the thermoplastic polymer layer (A) and thermoplastic polymer layer (F) each contains one or more additives or the like, the additives in both the layers may be of the same kind or different in kind. The thermoplastic polymer forming the thermoplastic polymer layer (F) may be a polymer modified for an improvement in adhesiveness to the polyamide-based resin. A glass fiber layer or a braid may be sandwiched between the thermoplastic polymer layer (A) and thermoplastic polymer layer (F). In cases where the laminated resin molding of the invention is used as a fuel tube, for instance, it is desirable that the thermoplastic polymer layer (F) is higher in oil resistance than the thermoplastic polymer layer (A). The thermoplastic polymer layer (F) may be more flexible than the thermoplastic polymer layer (A).

In achieving the first object of the invention, the polyamide-based resin layer (B) in the laminated resin molding preferably has a thickness not exceeding one fifth of the thickness of the thermoplastic polymer layer (A). When the thickness exceeds one fifth of the thickness of the thermoplastic polymer layer (A), the polyamide-based resin layer relatively low in flexibility becomes relatively thicker and the flexibility of the laminated resin molding obtained will unfavorably decrease. As for the lower limit to the thickness of the polyamide-based resin layer (B), a proper level of interlaminar adhesive strength can be attained if the thickness in question does not exceed one fifth of the thickness of the thermoplastic polymer layer (A), even if it is at least one fortieth of the thickness of the thermoplastic polymer layer (A).

In the case of the laminated resin molding P mentioned above, the total thickness of the polyamide-based resin layer (B1), polyamide-based resin layer (B2) and other layer (E) in the laminated resin molding is preferably not more than one fifth of the thickness of the thermoplastic polymer layer (A).

In achieving the first object of the invention, the thickness of the thermoplastic resin layer (C) is preferably less than 0.5 mm, although it is not particularly restricted. When it is 0.5 mm or thicker, the laminated resin molding obtained may show decreased transparency in some cases. As regards the lower limit to the thickness of the thermoplastic resin layer (C), that layer can show the desired chemical resistance, barrier quality and bacteria resistance, among others, when the thickness is 0.03 mm or more but does not exceed 0.5 mm.

In attaining the second object of the invention, the total thickness of the thermoplastic polymer layer (A) and thermoplastic resin layer (C) in the laminated resin molding is preferably 1.5 mm or less, more preferably 1 mm or less. That total thickness is preferably less than the thickness of the polyamide resin layer (B). When that total thickness exceeds the thickness of the polyamide resin layer (B), the strength of the laminated resin molding in the form of a tube decreases in some instances.

In accomplishing the first object of the invention, the laminated resin molding preferably has a modulus of elasticity in tension below 400 MPa, more preferably below 250 MPa. As for the lower limit to the modulus of elasticity in tension, a level of elasticity sufficient for the application as an ordinary tube for industrial use can be attained when the modulus of elasticity in tension is within the above range, even if it is 50 MPa. The tensile modulus of elasticity so referred to herein is the value measured at room temperature according to ASTM D 638 (1999). The laminated resin molding of the invention preferably has a tensile strength of 25 MPa or higher.

For use in the field of application where visibility from the outside is required, the total luminous transmittance of the laminated resin molding of the invention is preferably 75% or higher. If it is lower than 75%, the laminated resin molding of the invention will be unsatisfactory in transparency when it is to be used as a tube or hose, as described later herein; this is undesirable since the fluid flowing during use or the presence or absence of deposits on the inside wall cannot be confirmed or checked. As for the upper limit, the total luminous transmittance may be 97% or lower provided that it is not lower than 75%. It is to be adequately selected according to the intended use of the product laminated resin molding, among others. The total luminous transmittance so referred to herein is the value measured according to JIS K 7105 and, in the case of a tube or hose, the value obtained by cutting out the hose or tube with a cutter or the like, fixing the same in a flattened state and carrying out the measurement.

The laminated resin molding of the invention is a laminate comprising the thermoplastic polymer layer (A), polyamide-based resin layer (B) and thermoplastic resin layer (C) and, therefore, it has the excellent flexibility and transparency of the thermoplastic polymer forming the thermoplastic polymer layer (A) and the excellent chemical resistance, heat resistance, weather resistance, electrical insulation properties, nonstickiness, barrier properties, bacteria resistance and other properties of the thermoplastic resin forming the thermoplastic resin layer (C). Further, since the polyamide-based resin forming the polyamide-based resin layer (B) has an amine value within the specified range, the molding can have good interlaminar adhesive strength even when the thermoplastic polymer forming the thermoplastic polymer layer (A) is a thermoplastic elastomer and coextrusion is carried out at a relatively low temperature so that the thermoplastic elastomer may not produce bubbles.

In achieving the first object of the invention, the laminated resin molding can be further improved in flexibility by selecting the above-mentioned species as the thermoplastic polymer.

Even when immersed in any organic liquid selected from the group consisting of methanol, ethanol, fuel C [toluene:xylene=1:1 (by volume)], CM15 [toluene:xylene:methanol=42.5:42.5:15 (by volume)] and CE10 [toluene:xylene:ethanol=45:45:10 (by volume)] at a temperature of 40° C., the laminated resin molding of the invention in which each of the thermoplastic polymer layer (A) and thermoplastic resin layer (C) is a fluorine-containing ethylenic polymer layer preferably shows a lengthwise elongation in the planar direction and a change in diameter each not exceeding 2%.

The laminated resin molding of the invention in which each of the thermoplastic polymer layer (A) and thermoplastic resin layer (C) is a fluorine-containing ethylenic polymer layer preferably shows a fuel permeation rate not exceeding 1 g/m²/day, more preferably not exceeding 0.5 g/m²/day, against any organic liquid selected from the group consisting of methanol, ethanol, fuel C [toluene:xylene=1:1 (by volume)], CM15 [toluene:xylene:methanol=42.5:42.5:15 (by volume)] and CE10 [toluene:xylene:ethanol=45:45:10 (by volume)] at 27° C.

The laminated resin molding of the invention can be molded as a laminate by the simultaneous multilayer coextrusion technique using a coextrusion machine comprising a die and a plurality of extruders each for feeding a resin to the die. In achieving the first object of the invention, the die temperature is preferably not higher than 250° C.

Thus, when the die temperature is not higher than 250° C., the method of producing laminated resin moldings according to the invention is suitable as a method of producing laminated resin moldings for accomplishing the first object of the invention, and it consists in producing laminates by the simultaneous multilayer coextrusion technique using a coextrusion machine comprising a die and a plurality of extruders each for feeding a resin to the die and is characterized in that the die temperature is not higher than 250° C.

In accomplishing the second object of the invention, the laminated resin molding of the invention is preferably molded at a die temperature exceeding 250° C. but not exceeding 300° C. Thus, the method of producing laminated resin moldings according to the invention according to which the die temperature is higher than 250° C. but not higher than 300° C. is suitable as a method of producing laminated resin moldings for accomplishing the second object of the invention.

The die is not particularly restricted but may be any of those dies which are generally used in extrusion molding. For example, there may be mentioned manifold dies, blow molding dies, ring dies, screw dies, and tubing dies, among others. The die is appropriately selected according to the intended use of the product laminated resin moldings. Like in the case of the multilayer die mentioned above, the die temperature is not higher than 300° C. In achieving the first object of the invention, it is preferably set at a level not higher than 250° C., more preferably not higher than 230° C., still more preferably not higher than 220° C. It is set at 250° C. or below, preferably 230° C. or below, more preferably 220° C. or below. The lower limit to the temperature is set at that melting point of the polyamide-based resin forming the polyamide-based resin layer (B) or of the thermoplastic resin forming the thermoplastic resin layer (C), whichever is lower; preferably, however, it is not lower than 170° C., more preferably 190° C. or above.

In achieving the first object of the invention, the thermoplastic polymer in the laminated resin molding of the invention is preferably a thermoplastic elastomer and the thermoplastic resin is preferably a fluorine-containing ethylenic polymer so that the molding may have excellent flexibility, chemical resistance, liquid chemical impermeability and bacteria resistance. In this case, the thermoplastic elastomer is preferably a polyurethane-based elastomer, and the fluorine-containing ethylenic polymer is preferably the copolymer (IV) mentioned hereinabove referring to the fluorine-containing ethylenic polymer.

In accomplishing the second object of the invention, each of the thermoplastic resin and thermoplastic polymer is preferably a fluorine-containing ethylenic polymer so that the laminated resin molding of the invention may be excellent in chemical resistance, nonstickiness, elution resistance, antifouling quality and bacteria resistance on both sides and, further, it, as a laminate, may be excellent in fuel impermeability. Furthermore, the copolymer (IV) mentioned hereinabove referring to the fluorine-containing ethylenic polymer is preferred as the fluorine-containing ethylenic polymer.

The laminated resin molding of the invention may take the form of a multilayer molded article. The multilayer molded article comprises the laminated resin molding as at least a part thereof.

As examples of the multilayer molded article, there may be mentioned the following:

Tubes and hoses: tubes or hoses for feeding coatings, liquid chemical-transport tubes or hoses, transport tubes or hoses for agrochemicals, tubes or hoses for drinks, hydraulic tubes or hoses, pneumatic tubes or hoses, tubes to be buried underground in gas stations, automobile fuel piping tubes or hoses, automobile radiator hoses, brake hoses, air conditioner hoses, electric wires and cables, fuel cell hoses, etc.

Films and sheets: diaphragm pump diaphragms, various packing members and other sliding members required to have high chemical resistance, conveyor belts.

Tanks: automobile radiator tanks, liquid chemical bottles, liquid chemical tanks, bags, drug containers, gasoline tanks, etc.

Others: carburetor flange gaskets, fuel pump O rings, other various seals for automobiles, seals in pumps and flow meters for chemicals, other seals for use in chemistry and chemical industries, hydraulic machine seals, other seals for machinery, gears, etc.

The laminated resin molding of the invention is preferably used in the form of a hose or tube as a multilayer molded article, in particular.

Such laminated resin molding in the form of a hose or tube as a multilayer molded article constitutes an aspect of the invention. The hose or tube includes the same ones as enumerated hereinabove.

The multilayer molded article mentioned above is preferably a liquid chemical-transport tube or a liquid chemical-transport hose each having the thermoplastic polymer layer (A) as the outside layer and the polyamide-based resin layer (B) as the intermediate layer. The multilayer molded article in which the thermoplastic resin layer (C) formed out of a thermoplastic resin, in particular a fluorine-containing ethylenic polymer, serves as the inside layer is excellent in chemical resistance and, therefore, can be adequately used as a liquid chemical-transport tube or a liquid chemical-transport hose.

The liquid chemical is not particularly restricted but includes organic or inorganic liquids, for example organic acids such as acetic acid, formic acid, cresols and phenol; inorganic acids such as hydrochloric acid, nitric acid and sulfuric acid; solutions of alkalis such as sodium hydroxide and potassium hydroxide; alcohols such as methanol and ethanol; amines such as ethylenediamine, diethylenetriamine and ethanolamines; amides such as dimethylacetamide; esters such as ethyl acetate and butyl acetate; fuels such as gasoline, light oil and heavy oil, pseudofuels such as Fuel C, and mixed fuels composed of these and a peroxide, methanol, ethanol and/or the like.

Further, in accomplishing the first object of the invention, the multilayer molded article mentioned above is preferably a tube for feeding a coating or a hose for feeding a coating each having the thermoplastic polymer layer (A) as the outside layer, the thermoplastic resin layer (C) as the inside layer and the polyamide-based resin layer (B) as the intermediate layer. When the thermoplastic resin layer (C) is formed out of a thermoplastic resin, in particular a fluorine-containing ethylenic polymer, the multilayer molded article mentioned above is low in liquid chemical permeability and excellent in chemical resistance and, therefore, can be suitably used as a tube for feeding a coating or a hose for feeding a coating, even in transporting an ink diluted with xylene, for instance, without meaning any particular restriction.

Further, in accomplishing the first object of the invention, the multilayer molded article mentioned above is preferably a tube for drinks or a hose for drinks each having the thermoplastic polymer layer (A) as the outside layer, the thermoplastic resin layer (C) as the inside layer and the polyamide-based resin layer (B) as the intermediate layer. When the thermoplastic resin layer (C) is formed out of a thermoplastic resin, in particular a fluorine-containing ethylenic polymer, the multilayer molded article mentioned above is resistant to bacteria and is sanitary and, therefore, can be suitably used as a tube for drinks or a hose for drinks.

Further, in accomplishing the first object of the invention, the multilayer molded article mentioned above is preferably an automobile fuel piping tube or an automobile fuel piping hose each having the thermoplastic polymer layer (A) as the outside layer, the thermoplastic resin layer (C) as the inside layer and the polyamide-based resin layer (B) as the intermediate layer. When the thermoplastic resin layer (C) as the inside layer is formed out of a thermoplastic resin, in particular a fluorine-containing ethylenic polymer, the multilayer molded article mentioned above is low in liquid chemical permeability and, therefore, can be suitably used as an automobile fuel piping tube or an automobile fuel piping hose.

In achieving the first object of the invention, the liquid chemical-transport tube or liquid chemical-transport hose, tube for feeding a coating or hose for feeding a coating, tube for drinks or hose for drinks, or automobile fuel piping tube or automobile fuel piping hose, which is a multilayer molded article, is preferably such that the thermoplastic polymer is a thermoplastic elastomer and the thermoplastic resin is a fluorine-containing ethylenic polymer, since good flexibility, chemical resistance, liquid chemical impermeability and bacteria resistance can be attained then. In this case, the thermoplastic elastomer is preferably a polyurethane-based elastomer or a polyolefin-based elastomer, and the fluorine-containing ethylenic polymer is preferably the copolymer (IV) mentioned hereinabove referring to the fluorine-containing ethylenic polymer.

In achieving the second object of the invention, the multilayer molded article is preferably a tube to be buried underground in a gas station having the thermoplastic polymer layer (A) as the outside layer, the thermoplastic resin layer (C) as the inside layer and the polyamide-based resin layer (B) as the intermediate layer.

When each of the inside layer and outside layer is formed of a thermoplastic resin, in particular a fluorine-containing ethylenic polymer, this multilayer molded article is low in liquid chemical permeability and excellent in chemical resistance and elution resistance and, therefore, is preferably used as an inner tube, in particular, and can be adequately used even in transporting alcohol-supplemented fuels. When gasoline is transferred from a tank truck to a tank in a gas station, there arises the possibility of sparking due to electrostatic charging and, therefore, the thermoplastic resin layer (C) in the inner tube inside layer is preferably rendered electrically conductive. The above fluorine-containing ethylenic polymer is preferably the copolymer (IV) described hereinabove referring to the fluorine-containing ethylenic polymer.

In accomplishing the second object of the invention, the above-mentioned multilayer molded article, which is low in liquid chemical permeability and excellent in chemical resistance, elution resistance and bacteria resistance, is preferably used also as an outer tube of a duplex tube. Preferably, the multilayer molded article is simultaneously used as the inner tube and outer tube of the duplex tube, although it can also be used either as the inner tube or as the outer tube alone. The tube diameter may be not smaller than 5 mm but not greater than 100 mm.

In accomplishing the second object of the invention, the polyamide resin layer (B) in the multilayer molded article preferably has the constitution polyamide/modified polyolefin/polyamide, polyamide/modified polyolefin/polyolefin/modified polyolefin/polyamide or polyamide/modified polyolefin/Eval/modified polyolefin/polyamide, for instance. "Eval" is the product derived from an ethylene/vinyl acetate copolymer by hydrolysis.

In achieving the second object of the invention, the polyamide-based resin layer (B) in the multilayer molded article is divided into two polyamide layers, namely the polyamide-based resin layer (B1) and polyamide-based resin layer (B2) mentioned above, in constituting the laminate structure of the laminated resin molding P mentioned above, and these two polyamide-based resin layers may be the same or different in kind. From the ease of preparation viewpoint, however, they are preferably of the same kind.

In achieving the second object of the invention, the multilayer molded article is preferably a liquid chemical bottle having the thermoplastic polymer layer (A) as the outside layer, the thermoplastic resin layer (C) as the inside layer and the polyamide-based resin layer (B) as the intermediate layer. When each of the inside layer and outside layer is formed of a thermoplastic resin, in particular a fluorine-containing ethylenic polymer, the above-mentioned multilayer molded article is low in liquid chemical permeability and both the outside and inside surfaces are excellent in chemical resistance and elution resistance and, therefore, that molding is most suitably used as a liquid chemical bottle. The above fluorine-containing ethylenic polymer is preferably the copolymer (IV) described hereinabove referring to the fluorine-containing ethylenic polymer.

Effects of the Invention

The present invention, which has the constitution described hereinabove, can provide laminated resin moldings which are excellent in flexibility, liquid chemical impermeability, chemical resistance, barrier properties and bacteria resistance, among others, never undergo changes in size after immersion in fuels and are excellent in interlaminar adhesive strength. The multilayer molded articles comprising such laminated resin moldings can be suitably used as tubes or hoses or in like fields of application.

BEST MODES FOR CARRYING OUT THE INVENTION

The following synthesis examples, concrete examples and comparative examples illustrate the present invention in further detail. These examples are, however, by no means limitative of the scope of the invention. Parameter measurements were carried out in the following manner.
(1) Amine Value Measurement One gram of each polyamide-based resin was dissolved in 50 ml of m-cresol with heating, and the solution was titrated with a $\frac{1}{10}$ N aqueous solution of p-toluenesulfonic acid using thymol blue as an indicator to determine the quantity of amino groups occurring in each 106 g of the polyamide-based resin.
(2) Acid Value Measurement One gram of each polyamide-based resin was dissolved in 50 ml of benzyl alcohol with heating, and the solution was titrated with a $\frac{1}{30}$ N sodium hydroxide solution in benzyl alcohol using phenolphthalein as an indicator to determine the quantity of carboxyl groups occurring in each 106 g of the polyamide-based resin.
(3) Relative Viscosity Measurement In accordance with JIS K 6810, 1 g of each polyamide-based resin was dissolved in 100 ml of 98% sulfuric acid, and the measurement was carried out at 25° C. using an Ubbellohde viscometer.
(4) Measurement of the Number of Carbonate Groups A film with a thickness of 0.05 to 0.2 mm was prepared by room temperature compression molding of a white powder or cut pieces of pellets obtained by melt extrusion of each of the fluorine-containing ethylenic polymers obtained in Synthesis Examples 7 to 14 described later herein. In infrared absorption spectroscopic analysis, such a film shows a peak assignable to the carbonyl group of a carbonate group [—OC(=O)O—] at the absorption wavelength of 1809 cm$^{-1}$ ($\nu_{C=O}$). Therefore, the absorbance of that $\nu_{C=O}$ peak was measured. The number (N) of carbonate groups per $10^6$ main chain carbon atoms was calculated using the formula (1) given below.

$$N = 500AW/\epsilon df \qquad (1)$$

A: The absorbance of the $\nu_{C=O}$ peak in the carbonate group [—OC(=O)O—];
$\epsilon$: The molar extinction coefficient (l·cm$^{-1}$·mol$^{-1}$) of the $\nu_{C=O}$ peak in the carbonate group [—OC(=O)O—]; based on the data concerning model compounds, $\epsilon$ was estimated to be 170;
W: The average molecular weight of the monomers as calculated from the monomer composition;
d: The density of the film (g/cm$^3$);
f: The thickness of the film (mm).

The infrared absorption spectroscopic analysis was carried out by 40 times of scanning using a Perkin-Elmer model 1760X FTIR spectrometer (product of Perkin-Elmer). The IR spectrum obtained was subjected to automatic base line judgment using Perkin-Elmer Spectrum for Ver. 1.4C for the measurement of the absorbance of the peak at 1809 cm$^{-1}$. The film thickness was measured using a micrometer.
(5) Measurement of the Number of Fluoroformyl Groups In infrared spectroscopic analysis of a film obtained in the same manner as mentioned above under (4), a peak assignable to the carbonyl group of a carboxylic acid fluoride group [—C(=O)F] appears at the absorption wavelength of 1880 cm$^{-1}$ ($\nu_{C=O}$). Therefore, the absorbance of that $\nu_{C=O}$ peak was measured. Using the formula (1) given above, the number of fluoroformyl groups was determined in the same manner as in the measurement of the number of carbonate groups as described above under (4) except that the molar extinction coefficient (l·cm$^{-1}$ mol·$^{-1}$) of the $\nu_{C=O}$ peak in the carboxylic acid fluoride group was estimated at $\epsilon$=600 based on the data concerning model compounds.
(6) Measurement of the Number of Carboxyl Groups In infrared spectroscopic analysis of a film obtained in the same manner as mentioned above under (4), a peak assignable to the carbonyl group of a carboxyl group [—C(=O)OH] appears at the absorption wavelength of 1764 cm$^{-1}$ ($\nu_{C=O}$). Therefore, the absorbance of that $\nu_{C=O}$ peak was measured. Using the formula (1) given above, the number of carboxyl groups was determined in the same manner as in the measurement of the number of carbonate groups as described above under (4) except that the molar extinction coefficient (l·cm$^{-1}$·mol$^{-1}$) of the $\nu_{C=O}$ peak in the carboxyl group was estimated at $\epsilon$=530 based on the data concerning model compounds.

(7) Determination of the Composition of the Fluorine-Containing Ethylenic Polymer The composition was determined by $^{19}$F-NMR analysis.

(8) Melting Point (Tm) Measurement

A Seiko DSC apparatus was used. The melting peak was recorded while raising the temperature at a rate of 10° C./minute, and the temperature corresponding to the maximum value was regarded as the melting point (Tm).

(9) MFR (Melt Flow Rate) Measurement

Using a melt indexer (product of Toyo Seiki Seisakusho), the weight (g) of the polymer flowing out through a nozzle with a diameter of 2 mm and a length of 8 mm during a unit time (10 minutes) under a load of 5 kg at each temperature was measured.

(10) Appearances of the Inside and Outside Surfaces of each Multilayer Tube

The tube obtained was cut into half-round halves, and the inside and outside surfaces of the tube were observed by the eye or under a stereoscopic microscope (×50). The following criteria were used in judging the surfaces with respect to such bad conditions as surface roughness, bubble formation and so forth.

○: No bad condition in appearance is seen at all.

Δ: Some or other bad conditions are found on less than 2% of the whole surface.

X: Some or other bad conditions are found on 2% or more of the whole surface.

(11) Measurement of the Initial Adhesive Strength of the Multilayer Tube

Test specimens with a length of 5 cm and a width of 1 cm were cut out of each tube and subjected to an adhesion test (peeling at 180°) using a Tensilon universal testing machine at a rate of 25 mm/minute. The interlaminar initial adhesive strength was determined as the mean of five maxima in elongation-tensile strength graphs.

(12) Total Luminous Transmittance

A 3-cm-long piece was cut off from each tube and cut open lengthwise at a site. The opened piece was fixed on a supporting member, and the total luminous transmittance was measured using a haze meter (product of Toyo Seiki Seisakusho).

(13) Modulus of Elasticity in Tension and Tensile Strength

The values (MPa) reported herein are those measured at room temperature according to ASTM D 638 (1999) (rate of pulling: 50 cm/min).

(14) Measurement of Changes in Size after Immersion in a Fuel

A 30-cm-long section was cut off from each tube, and CM15 [toluene:xylene:methanol=42.5:42.5:15 (by volume)] was sealed in the tube section using Swagelok fittings (available from Osaka Valve Fittings). Further, this tube was immersed in a CM15 bath maintained at a constant temperature (40° C.) for 1000 hours. Size measurements were carried out before and after immersion and the percent change was calculated as follows: (change in size/original size)×100. Each measured value was expressed in terms of absolute value.

(15) Fuel Permeation Rate

A 200-cm-long section of the tube was cut off, and the liquid chemical (CM15) was sealed in the tube section. Further, this tube section was placed in a thermostat maintained at a constant temperature (27° C.) and weighed. The rate was calculated from the time point of arrival at a constant rate of weight loss per unit time. The inside surface area of the tube section was used as the area for calculation.

Synthesis Example 1

Synthesis of Polyamide-Based Resin PA-A (Nylon 12)

An autoclave was charged with 20 kg of ω-laurolactam and 1 kg of distilled water and, after nitrogen substitution, the temperature was raised to 280° C. Then, the system inside was maintained at 3.2 MPa at the same temperature for 5 hours, followed by gradual pressure release. During the pressure release period until returning of the system to atmospheric pressure, the ω-laurolactam was allowed to be dissolved in water and, after dissolution, the solution was stirred. After returning of the system to atmospheric pressure, 100 g of stearic acid was added and the resulting mixture was further stirred at 260° C. in a nitrogen atmosphere for 5 hours. The contents were then discharged, cooled with water and submitted to a pelletizer to give white pellets (polyamide-based resin PA-A). Analyses revealed that these pellets had a melting point of 178° C., an acid value of 28 (equivalents/10$^6$ g), an amine value of 6.8 (equivalents/10$^6$ g), and a relative viscosity of 3.0.

Synthesis Example 2

Synthesis of Polyamide-Based Resin PA-B (Nylon 12)

Polyamide-based resin PA-B was obtained in the same manner as in Synthesis Example 1 except that the addition of stearic acid was omitted and that the time of stirring in a nitrogen atmosphere was 4 hours. The results of analyses are shown in Table 1.

Synthesis Example 3

Synthesis of Polyamide-Based Resin PA-C (Nylon 11)

An autoclave was charged with 20 kg of 11-aminoundecanoic acid in powder form, 5 kg of distilled water and 100 g of a 30% aqueous solution of phosphoric acid and, after nitrogen substitution, tightly closed. The temperature was raised to and maintained at 120° C. for 2 hours and then further raised to 220° C., and the system inside was maintained at that temperature and a pressure of 0.4 MPa for 2 hours, followed by gradual pressure release. During the pressure release period until returning of the system to atmospheric pressure, the 11-aminoundecanoic acid was allowed to be dissolved in water and, after dissolution, the solution was stirred. After returning of the system to atmospheric pressure, 110 g of stearic acid was added and the resulting mixture was further stirred at 265° C. in a nitrogen atmosphere for 4 hours. The contents were then discharged, cooled with water and submitted to a pelletizer to give white pellets (polyamide-based resin PA-C). The results of analyses are shown in Table 1.

Synthesis Example 4

Synthesis of Polyamide-Based Resin PA-D (Nylon 11)

Pellets (polyamide-based resin PA-D) were obtained in the same manner as in Synthesis Example 3 except that the addition of stearic acid was omitted and that the time of stirring in a nitrogen atmosphere was 3 hours. The results of analyses are shown in Table 1.

Synthesis Example 5

Synthesis of Polyamide-Based Resin PA-E
(Plasticizer-Containing Nylon 12)

The polyamide-based resin PA-B obtained in Synthesis Example 2 and N-ethyltoluenesulfonamide were dry-blended together in a weight ratio of 95/5, and the resulting mixture was extruded at 260° C. and a discharge rate of 350 g/minute using a twin-screw extruder (Ikegai Corporation model PCM-45) and, after water cooling, the extrudate was submitted to a pelletizer to give white pellets (polyamide-based resin PA-E). The results of analyses are shown in Table 1.

Synthesis Example 6

Synthesis of Polyamide-Based Resin PA-F (Nylon 6)

An autoclave was charged with 20 kg of ε-caprolactam and 2 kg of distilled water and, after nitrogen substitution, the temperature was raised to 120° C. While maintaining that temperature, the ε-caprolactam was allowed to be dissolved in water and, after dissolution, stirring was started. The temperature was further raised to 220° C., and the system inside was maintained at that temperature and at a pressure of 0.4 MPa for 5 hours. The temperature was then raised to 250° C. with gradual pressure release. After returning of the system to atmospheric pressure, the contents were further stirred at 250° C. in a nitrogen atmosphere for 3 hours, then discharged, cooled with water and submitted to a pelletizer to give white pellets. These pellets were then immersed in distilled water at 80° C. for 12 hours for extraction of low-molecular-weight substances such as the monomer. The pellets were thoroughly dried and subjected to the subsequent procedure. The results of analyses of the pellets (polyamide-based resin PA-F) after drying are shown in Table 1.

TABLE 1

| Synthesis Example | Polyamide-based resin | | Amine value (equivalents/ $10^6$ g) | Acid value (equivalents/ $10^6$ g) | Melting point (° C.) | Relative viscosity |
|---|---|---|---|---|---|---|
| 1 | PA-A | Nylon 12 | 6.8 | 28 | 178 | 3.0 |
| 2 | PA-B | Nylon 12 | 24 | 29 | 178 | 3.2 |
| 3 | PA-C | Nylon 11 | 8.4 | 33 | 186 | 2.9 |
| 4 | PA-D | Nylon 11 | 32 | 34 | 186 | 2.9 |
| 5 | PA-E | Nylon 12 + plasticizer | 23 | 28 | 174 | 3.0 |
| 6 | PA-F | Nylon 6 | 31 | 35 | 224 | 3.4 |

Synthesis Example 7

Synthesis of Fluorine-Containing Ethylenic Polymer F-A

An autoclave was charged with 380 L of distilled water and, after thorough nitrogen substitution, further charged with 75 kg of 1-fluoro-1,1-dichloroethane, 155 kg of hexafluoropropylene and 0.5 kg of perfluoro(1,1,5-trihydro-1-pentene). The system inside was maintained at 35° C. and at a rate of stirring of 200 rpm. Then, tetrafluoroethylene was fed under pressure until arrival at 0.7 MPa, ethylene was then fed under pressure until arrival at 1.0 MPa and, thereafter, 2.4 kg of di-n-propyl peroxydicarbonate was charged into the autoclave to initiate the polymerization. To compensate the system inside pressure drop resulting from the progress of the polymerization, a mixed gas composed of tetrafluoroethylene/ethylene/hexafluoropropylene=40.5/44.5/15.0 (in mole percent) was continuously fed to thereby maintain the system inside pressure at 1.0 MPa. And, a total amount of 1.5 kg of perfluoro(1,1,5-trihydro-1-pentene) was continuously fed, and stirring was continued for 20 hours. After pressure release to atmospheric pressure, the reaction product was washed with water and dried to give 205 kg of a powder (fluorine-containing ethylenic polymer F-A). The results of analyses of the powder obtained are shown in Table 2.

Synthesis Examples 8 and 9

Synthesis of Fluorine-Containing Ethylenic Polymers F-B and F-C

Fluorine-containing ethylenic polymers F-B and F-C were obtained in the same manner as in Synthesis Example 7 according to the respective monomer compositions shown in Table 2. The results of analyses of the polymers obtained are shown in Table 2.

Synthesis Example 10

Fluorine-Containing Ethylenic Polymer F-D

An autoclave was charged with 400 L of distilled water and, after thorough nitrogen substitution, further charged with 320 kg of perfluorocyclobutane, 80 kg of hexafluoropropylene, 19 kg of tetrafluoroethylene and 6 kg of vinylidene fluoride. The system inside was maintained at 35° C. and at a rate of stirring of 180 rpm. Then, 5 kg of di-n-propyl peroxydicarbonate was fed to initiate the polymerization. To compensate the system inside pressure drop resulting from the progress of the polymerization, a mixed gas composed of tetrafluoroethylene/vinylidene fluoride/hexafluoropropylene=50/40/10 (in mole percent) was continuously fed to thereby maintain the system inside pressure at a constant level. After 30 hours of continuous stirring and the subsequent pressure release to atmospheric pressure, the reaction product was washed with water and dried to give 195 kg of a powder (fluorine-containing ethylenic polymer F-D). The results of analyses of the powder obtained are shown in Table 2.

Synthesis Example 11

Synthesis of Fluorine-Containing Ethylenic Polymer F-E

An autoclave was charged with 400 L of distilled water and, after thorough nitrogen substitution, further charged with 75 kg of 1-fluoro-1,1-dichloroethane, 190 kg of hexafluoropropylene and 1.5 kg of perfluoro(1,1,5-trihydro-1-pentene). The system inside was maintained at 35° C. and at a rate of stirring of 200 rpm. Then, tetrafluoroethylene was fed under pressure until arrival at 0.7 MPa, ethylene was then fed under pressure until arrival at 10 kg/cm² and, thereafter, 2.6 kg of di-n-propyl peroxydicarbonate was charged into the autoclave to initiate the polymerization. To compensate the system inside pressure drop resulting from the progress of the polymerization, a mixed gas composed of tetrafluoroethylene/ethylene/hexafluoropropylene=40.5/42.5/17.0 (in mole percent) was continuously fed to thereby maintain the system inside pressure at 1.0 MPa. After 30 hours of continuous stirring and the subsequent pressure release to atmospheric pressure, the reaction product was washed with water and dried to give 178 kg of a powder. The powder obtained was then submitted to a single-screw extruder (Tanabe Plastic Kikai model VS50-24). Extrusion at a cylinder temperature of 320° C. gave pellets (fluorine-containing ethylenic polymer F-E). The results of analyses of the pellets obtained are shown in Table 2.

Synthesis Example 12

Synthesis of Fluorine-Containing Ethylenic Polymer F-F

An autoclave was charged with 25 kg of distilled water and, after thorough nitrogen substitution, further charged with 50 kg of perfluorocyclobutane and 10 kg of perfluoro(methyl vinyl ether), and the system inside was maintained at 35° C. and at a rate of stirring of 215 rpm. Then, tetrafluoroethylene was fed under pressure until arrival at 0.78 MPa and, then, 150 kg of di-n-propyl peroxydicarbonate was fed to initiate the polymerization. To compensate the system inside pressure drop resulting from the progress of the polymerization, a mixed gas composed of perfluorocyclobutane/tetrafluoroethylene/perfluoro(methyl vinyl ether)=10/76.6/13.4 (in mole percent) was continuously fed to thereby maintain the system inside pressure at 0.78 MPa. After 30 hours of continuous stirring and the subsequent pressure release to atmospheric pressure, the reaction product was washed with water and dried to give 30 kg of a powder (fluorine-containing ethylenic polymer F-F). The results of analyses of the powder obtained are shown in Table 2.

Synthesis Example 13

Synthesis of Fluorine-Containing Ethylenic Polymer F-G

An autoclave was charged with 9.5 kg of the fluorine-containing ethylenic polymer F-B obtained in Synthesis Example 8, 700 g of 28% aqueous ammonia and 10 L of distilled water, the system was heated with stirring, and stirring was continued at 80° C. for 7 hours. The contents were washed with water and dried to give 9.5 kg of a powder. Such treatment converted the active functional groups (carbonate and fluoroformyl groups) of the polymer to amide groups low in reactivity. Infrared spectroscopic analysis confirmed that this conversion to amide groups was quantitative. The results of analyses of the polymer after the above treatment are shown in Table 2.

Synthesis Example 14

Synthesis of Fluorine-Containing Ethylenic Polymer F-H

The fluorine-containing ethylenic polymer F-B obtained in Synthesis Example 8 and acetylene black were mixed up in a Henschel mixer in a weight ratio of 86:14, followed by melt kneading at 245° C. on a 40Φ twin-screw extruder (for convenience sake, the acetylene black-containing mixture obtained is referred to as "fluorine-containing polymer F-H"). The results of analyses thereof are shown in Table 2.

In Table 2, TFE stands for tetrafluoroethylene, Et for ethylene, HFP for hexafluoropropylene, VdF for vinylidene fluoride, PMVE for perfluoro(methyl vinyl ether), and HF-Pe for perfluoro(1,1,5-trihydro-1-pentene).

TABLE 2

| Synthesis Example | Designation | Fluororesin | | | | | | Carbonyl group contents (groups/ $1 \times 10^6$ main chain carbon atoms) | | Total luminous transmittance of 500-μm-thick film | Melting point (° C.) | MFR (g/10 min) 265° C. |
|---|---|---|---|---|---|---|---|---|---|---|---|---|
| | | Monomer composition (mole %) | | | | | | Carbonate group | Fluoroformyl group | | | |
| | | TFE | Et | HFP | VdF | PMVE | HF-Pe | | | | | |
| 7 | F-A | 40.8 | 44.8 | 13.9 | — | — | 0.5 | 300 | 3 | 92 | 162.5 | 50 |
| 8 | F-B | 46.2 | 43.8 | 9.5 | — | — | 0.5 | 255 | 5 | 91 | 194.3 | 25 |
| 9 | F-C | 47.1 | 44.1 | 8.3 | — | — | — | 189 | 7 | 90 | 207.4 | 18 |
| 10 | F-D | 51.3 | — | 9.8 | 38.9 | — | 0.5 | 311 | 3 | 92 | 169.2 | 40 |
| 11 | F-E | 40.5 | 45.0 | 14.0 | — | — | 0.5 | 67 | 67 | 91 | 170.2 | 24 |
| 12 | F-F | 84.5 | — | — | — | 15.5 | — | 330 | 3 | 90 | 210.0 | 20 |
| 13 | F-G | 46.1 | 43.8 | 9.6 | — | — | 0.5 | Not detected | Not detected | 91 | 193.5 | 20 |
| 14 | F-H | 46.1 | 43.8 | 9.6 | — | — | 0.5 | 75 | 37 | — | 196.1 | 4 |

Experiment Example 1

Using a three-resin three-layer coextruding machine equipped with a multimanifold die, a tube with an outside diameter of 8 mm and an inside diameter of 6 mm the outer layer of which was formed of a thermoplastic elastomer, the intermediate layer of which was formed of a polyamide-based resin and the inner layer of which was formed of a fluorine-containing ethylenic polymer was continuously molded by feeding the thermoplastic elastomer, polyamide-based resin and fluorine-containing ethylenic polymer specified in Table 3 to the extruders for the outer, intermediate and inner layers, respectively. The molding conditions and the results of evaluation of the tube obtained are shown in Table 3.

Experiment Examples 2 to 20

Tubes were molded in the same manner as in Experiment Example 1 except that the resins and molding conditions used in Experiment Examples 2 to 11 were as shown in Table 3 and those used in Experiment Examples 12 to 20 were as shown in Table 4. The molding conditions used and the results of evaluation of the tubes obtained in Experiment Examples 2 to 11 are shown in Table 3 and those in Experiment Examples 12 to 20 are shown in Table 4.

In Tables 3 and 4, the thermoplastic elastomer TPU-1 stands for 2288 (polyurethane-based elastomer produced by using a polyether polyol as a long-chain diol; product of Dainichiseika Color & Chemicals Mfg. Co.), TPU-2 for 1078 (polyurethane-based elastomer produced by using a polyester polyol as a long-chain diol; product of Dainichiseika Color & Chemicals), and TPU-3 for 890 (polyurethane-based elastomer produced by using a polycarbonate polyol as a long-chain diol; product of Dainichiseika Color & Chemicals).

TABLE 3

| | | Experiment Example | | | | | | |
|---|---|---|---|---|---|---|---|---|
| | | 1 | 2 | 3 | 4 | 5 | 6 | 7 |
| Outer layer thermoplastic polymer | | TPU1 | TPU1 | TPU1 | TPU1 | TPU1 | TPU1 | TPU1 |
| Intermediate layer resin | | PA-E | PA-E | PA-E | PA-E | PA-E | PA-E | PA-D |
| Inner layer resin | | F-A | F-B | F-C | F-D | F-E | F-F | F-B |
| Cylinder temperature (° C.) | Outer layer | 210 | 210 | 210 | 210 | 210 | 210 | 210 |
| | Intermediate layer | 210 | 210 | 210 | 210 | 210 | 210 | 210 |
| | Inner layer | 210 | 220 | 230 | 220 | 220 | 220 | 220 |
| Die temperature (° C.) | | 220 | 230 | 235 | 230 | 230 | 230 | 230 |
| Tube takeoff speed (m/min) | | 6 | 6 | 6 | 6 | 6 | 6 | 6 |
| Each layer thickness (mm) | Outer layer | 1 | 1 | 1 | 1 | 1 | 1 | 1 |
| | Intermediate layer | 0.05 | 0.05 | 0.05 | 0.05 | 0.05 | 0.05 | 0.05 |
| | Inner layer | 0.25 | 0.25 | 0.25 | 0.25 | 0.25 | 0.25 | 0.25 |
| Total luminous transmittance (%) | | 79 | 80 | 81 | 80 | 81 | 80 | 81 |
| Modulus of elasticity in tension (MPa) | | 175 | 170 | 170 | 165 | 175 | 165 | 170 |
| Appearance of tube inside and outside surfaces | | ○ | ○ | ○ | ○ | ○ | ○ | ○ |
| Adhesive strength (N/cm) | Outer layer/intermediate layer | No peeling off | No peeling off | No peeling off | No peeling off | No peeling off | No peeling off | No peeling off |
| | Intermediate layer/inner layer | 45 | 47 | 47 | 43 | 45 | 35 | 46 |

| | | Experiment Example | | | |
|---|---|---|---|---|---|
| | | 8 | 9 | 10 | 11 |
| Outer layer thermoplastic polymer | | TPU1 | TPU1 | TPU2 | TPU3 |
| Intermediate layer resin | | PA-B | PA-F | PA-E | PA-E |
| Inner layer resin | | F-B | F-B | F-B | F-B |
| Cylinder temperature (° C.) | Outer layer | 210 | 240 | 210 | 210 |
| | Intermediate layer | 210 | 240 | 210 | 210 |
| | Inner layer | 220 | 220 | 220 | 220 |
| Die temperature (° C.) | | 230 | 240 | 230 | 230 |
| Tube takeoff speed (m/min) | | 6 | 10 | 6 | 6 |
| Each layer thickness (mm) | Outer layer | 1 | 1 | 1 | 1 |
| | Intermediate layer | 0.05 | 0.05 | 0.05 | 0.05 |
| | Inner layer | 0.25 | 0.25 | 0.25 | 0.25 |
| Total luminous transmittance (%) | | 80 | 78 | 80 | 79 |
| Modulus of elasticity in tension (MPa) | | 170 | 170 | 165 | 170 |
| Appearance of tube inside and outside surfaces | | ○ | ○ | ○ | ○ |
| Adhesive strength (N/cm) | Outer layer/intermediate layer | No peeling off | No peeling off | No peeling off | No peeling off |
| | Intermediate layer/inner layer | 47 | 49 | 47 | 47 |

TABLE 4

| | | Experiment Example | | | | | | | | |
|---|---|---|---|---|---|---|---|---|---|---|
| | | 12 | 13 | 14 | 15 | 16 | 17 | 18 | 19 | 20 |
| Outer layer thermoplastic polymer | | TPU-1 | TPU-1 | TPU-2 | TPU-2 | TPU-1 | TPU-1 | TPU-1 | TPU-2 | — |
| Intermediate layer resin | | PA-C | PA-C | PA-A | PA-A | PA-B | PA-B | — | — | PA-E |
| Inner layer resin | | F-B | F-B | F-A | F-A | F-G | F-G | F-B | F-A | F-G |
| Cylinder temperature (° C.) | Outer layer | 210 | 210 | 210 | 210 | 210 | 210 | 210 | 210 | 210 |
| | Intermediate layer | 245 | 210 | 245 | 210 | 245 | 210 | — | — | 210 |
| | Inner layer | 260 | 210 | 260 | 210 | 260 | 210 | 210 | 210 | 210 |
| Die temperature (° C.) | | 260 | 220 | 260 | 220 | 260 | 220 | 240 | 220 | 260 |
| Tube takeoff speed (m/min) | | 6 | 6 | 6 | 6 | 6 | 6 | 6 | 6 | 6 |
| Each layer thickness (mm) | Outer layer | 1 | 1 | 1 | 1 | 1 | 1 | 1 | 1 | — |
| | Intermediate layer | 0.05 | 0.05 | 0.05 | 0.05 | 0.05 | 0.05 | 0.05 | 0.05 | 1.05 |
| | Inner layer | 0.25 | 0.25 | 0.25 | 0.25 | 0.25 | 0.25 | 0.25 | 0.25 | 0.25 |
| Total luminous transmittance (%) | | 40 | 80 | 40 | 79 | 42 | 53 | 82 | 82 | 67 |
| Modulus of elasticity in tension (MPa) | | — | — | — | — | — | — | — | — | 900 |
| Appearance of tube inside and outside surfaces | | Failure in molding[x] | ○ | Failure in molding[x] | ○ | Failure in molding[x] | ○ | ○ | ○ | ○ |

TABLE 4-continued

| | | Experiment Example | | | | | | | |
|---|---|---|---|---|---|---|---|---|---|
| | | 12 | 13 | 14 | 15 | 16 | 17 | 18 | 19 | 20 |
| Adhesive strength (N/cm) | Outer layer/ intermediate layer | — | No peeling off | — | No peeling off | — | No peeling off | 5 | 5 | 45 |
| | Intermediate layer/ inner layer | — | 8 | — | 7 | — | 6 | | | |

As is evident from the results shown in Table 3 and Table 4, the tubes of Experiment Examples 1 to 11 were all satisfactory in tube inside and outside surface appearance and in initial interlaminar adhesive strengths. Even when the intermediate layer-forming polyamide-based resin was a plasticizer-containing one, the appearance and initial adhesive strengths were good. On the contrary, the tubes of Experiment Example 13 and Experiment Example 15, in which the polyamide-based resins used were low in amine value, and the tubes of Experiment Example 12 and Experiment Example 14, in which the polyamide-based resins used were low in amine value and the die temperature in molding was above 250° C., were inferior either in initial intermediate layer/inner layer adhesive strength or in tube inside and outside surface appearance.

The tubes of Experiment Examples 16 and 17, in which the fluorine-containing ethylenic polymer used was an amide group-containing one resulting from carbonyl group-containing group-to-amide group conversion, were inferior in initial intermediate layer/inner layer adhesive strengths and in tube inside and outside surface appearance, irrespective of the die temperature in tube molding.

When no polyamide intermediate layer was employed, even the carbonyl group-containing, fluorine-containing ethylenic polymers failed to provide good adhesion, as shown by the results of Experiment Examples 18 and 19.

As shown by the result of Experiment Example 20, the two-layer tube with a polyamide as the outer layer was inferior in total luminous transmittance.

Experiment Examples 21 to 24

Using a three-resin three-layer coextruding machine equipped with a multimanifold die, tubes the outer layer of which was formed of a thermoplastic elastomer, the intermediate layer of which was formed of a polyamide-based resin and the inner layer of which was formed of a fluorine-containing ethylenic polymer were continuously molded by feeding the thermoplastic elastomer, polyamide-based resin and fluorine-containing ethylenic polymer respectively specified in Table 5 to the extruders for the outer, intermediate and inner layers, respectively. The molding conditions and the results of evaluation of the tubes obtained are shown in Table 5.

In Table 5, the thermoplastic elastomer OP-1 stands for the polyolefin-based elastomer Santoprene 191-70PA (product of AES Japan Ltd.).

TABLE 5

| | | Experiment Example | | | |
|---|---|---|---|---|---|
| | | 21 | 22 | 23 | 24 |
| Outer layer thermoplastic polymer | | OP1 | OP1 | OP1 | OP1 |
| Intermediate layer resin | | PA-E | PA-E | PA-A | PA-E |
| Inner layer resin | | F-B | F-H | F-B | F-B |
| Cylinder temperature (° C.) | Outer layer | 210 | 210 | 210 | 210 |
| | Intermediate layer | 245 | 245 | 245 | 245 |
| | Inner layer | 250 | 260 | 250 | 250 |
| Die temperature (° C.) | | 235 | 245 | 235 | 270 |
| Tube takeoff speed (m/min) | | 2 | 2 | 2 | 2 |
| Each layer thickness (mm) | Outer layer | 0.2 | 0.2 | 0.2 | 0.2 |
| | Intermediate layer | 0.15 | 0.15 | 0.15 | 0.15 |
| | Inner layer | 0.8 | 0.8 | 0.8 | 0.8 |
| Tube diameter (mm) | | 15 | 15 | 15 | — |
| Appearance of tube inside and outside surfaces | | ○ | ○ | ○ | Failure in molding* |
| Modulus of elasticity in tension (MPa) | | 150 | 170 | 200 | Not measured |
| Tube resistance value (MΩ/sq) | | — | 0.2 | — | — |
| Adhesive strength (N/cm) | Outer layer/ intermediate layer | No peeling off | No peeling off | No peeling off | — |
| | Intermediate layer/ inner layer | No peeling off | No peeling off | 10 | — |

As is evident from the results shown in Table 5, the tubes of Experiment Examples 21 and 22, in which the inner layer was formed of a fluorine-containing ethylenic polymer derived from TFE/Et/HFP/HF-Pe and the lamination was carried out at a die temperature lower than 250° C., were satisfactory in tube inside and outside surface appearance and in initial interlaminar adhesive strengths. The tube of Experiment Example 23, in which the polyamide-based resin used was low in amine value, was inferior in initial intermediate layer/inner layer adhesive strength. In Experiment Example 24, in which the die temperature was above 250° C., no tube could be molded.

Experiment Examples 25 to 30

Using a three-resin three-layer coextruding machine equipped with a multimanifold die, tubes the outer layer of which was formed of a thermoplastic polymer, the intermediate layer of which was formed of a polyamide-based resin and the inner layer of which was formed of a fluorine-containing ethylenic polymer were continuously molded by feeding the fluorine-containing ethylenic polymer, polyamide-based resin and fluorine-containing ethylenic polymer respectively specified in Table 6 to the extruders for the outer, intermediate and inner layers, respectively. The molding conditions and the results of evaluation of the tubes obtained are shown in Table 6.

TABLE 6

| | | Experiment Example | | | | | |
|---|---|---|---|---|---|---|---|
| | | 25 | 26 | 27 | 28 | 29 | 30 |
| Outer layer thermoplastic polymer | | F-B | F-B | F-B | F-F | F-B | — |
| Intermediate layer resin | | PA-E | PA-E | PA-E | PA-E | PA-A | PA-E |
| Inner layer resin | | F-B | F-H | F-F | F-F | F-B | F-B |
| Cylinder temperature (° C.) | Outer layer | 250 | 250 | 250 | 250 | 250 | — |
| | Intermediate layer | 245 | 245 | 245 | 245 | 245 | 245 |
| | Inner layer | 250 | 260 | 250 | 250 | 250 | 250 |
| Die temperature (° C.) | | 270 | 280 | 270 | 270 | 270 | 270 |
| Tube takeoff speed (m/min) | | 4 | 4 | 4 | 4 | 4 | 4 |
| Each layer thickness (mm) | Outer layer | 0.25 | 0.25 | 0.25 | 0.25 | 0.25 | — |
| | Intermediate layer | 0.65 | 0.65 | 0.65 | 0.65 | 0.65 | 0.9 |
| | Inner layer | 0.25 | 0.25 | 0.25 | 0.25 | 0.25 | 0.25 |
| Tube diameter (mm) | | 8.2 | 8.2 | 8.2 | 8.2 | 8.2 | 8.2 |
| Appearance of tube inside and outside surfaces | | ○ | ○ | ○ | ○ | ○ | ○ |
| Change in size after immersion in fuel (%) | Diameter | <2% | <2% | <2% | <2% | <2% | >2% |
| | Length | <2% | <2% | <2% | <2% | <2% | >2% |
| Fuel permeation rate (g/m²/day) | CM15 27° C. | 0.3 | 0.3 | 0.2 | 0.1 | 0.3 | 0.6 |
| Tube resistance value (MΩ/sq) | | — | 0.1 | — | — | — | — |
| Adhesive strength (N/cm) | Outer layer/ intermediate layer | 46 | 45 | 47 | No peeling off | 15 | — |
| | Intermediate layer/ inner layer | 45 | No peeling off | No peeling off | No peeling off | 15 | 45 |

As is evident from the results shown in Table 6, the tubes of Experiment Examples 25 to 28 (in particular the tube of Experiment Example 28), in which one or two fluorine-containing ethylenic polymers were used in forming the outer and inner layers, were satisfactory in tube inside and outside surface appearance and in initial interlaminar adhesive strengths. Even when the intermediate layer-forming polyamide-based resin was a plasticizer-containing one, the appearance and initial adhesive strength were good. Further, the fuel permeation rates were as low as 0.5 g/m²/day or lower, and the changes in size after immersion in fuel were not greater than 2%.

On the contrary, the tube of Experiment Example 29, in which the polyamide-based resin used was low in amine value, was inferior in initial intermediate layer/inner layer adhesive strength and in initial intermediate layer/outer layer adhesive strength.

Furthermore, in Experiment Example 30, in which no fluorine-containing ethylenic polymer outer layer was formed, the fuel impermeability was unsatisfactory and the change in size after immersion in fuel exceeded 2%.

INDUSTRIAL APPLICABILITY

The invention, which has the constitution described hereinabove, can provide laminated resin moldings which are excellent in flexibility, liquid chemical impermeability, chemical resistance, barrier quality and bacteria resistance, among others, will not show changes in size after immersion in fuels and are excellent in interlaminar adhesive strength. The multilayer molded articles obtainable based on the above-mentioned laminated resin moldings can be suitably used as tubes or hoses or in other fields of application.

The invention claimed is:

1. A laminated resin molding comprising a thermoplastic polymer layer (A), a polyamide-based resin layer (B) and a thermoplastic resin layer (C), which is a hose or a tube, which is obtained by a method comprising laminating by the simultaneous multilayer coextrusion technique using a coextruding machine comprising a die and a plurality of extruders each for feeding a resin to said die, said die temperature being not higher than 230° C., wherein said thermoplastic polymer layer (A), said polyamide-based resin layer (B) and said thermoplastic resin layer (C) are laminated in that order and directly firmly adhered to one another, said thermoplastic polymer is to adhere to the polyamide-based resin by thermal fusion bonding, the initial adhesive strength between the thermoplastic polymer layer (A) and the polyamide-based resin layer (B) is not lower than 25 N/cm, the initial adhesive strength between the polyamide-based resin layer (B) and thermoplastic resin layer (C) is not lower than 25 N/cm, said polyamide-based resin has an amine value of 15 to 35 (equivalents/$10^6$ g), said thermoplastic resin contains a functional group and is to thereby firmly adhere to said polyamide-based resin by thermal fusion bonding, said functional group contains carbonyl group, said thermoplastic polymer layer (A) consists essentially of said thermoplastic polymer, said thermoplastic polymer is a thermoplastic elastomer comprising a polyurethane-based elastomer, and said thermoplastic resin comprises a fluorine-containing ethylenic polymer.

2. The laminated resin molding according to claim 1, wherein the polyamide-based resin has an acid value of not higher than 80 (equivalents/$10^6$ g).

3. The laminated resin molding according to claim 1, which has a modulus of elasticity in tension of lower than 400 MPa.

4. The laminated resin molding according to claim 1, wherein the polyamide-based resin layer (B) has a thickness not exceeding one fifth of the thickness of the thermoplastic polymer layer (A).

5. The laminated resin molding according to claim 1, which shows a total luminous transmittance of not lower than 75%.

6. A method for producing the laminated resin molding according to claim 1, which comprises laminating by the simultaneous multilayer coextrusion technique using a coextruding machine comprising a die and a plurality of extruders each for feeding a resin to said die, said die temperature being not higher than 230° C.

7. The multilayer molded article according to claim 1 which is a liquid chemical-transport tube or a liquid chemical-transport hose each having the thermoplastic polymer layer (A) as an outer layer, the thermoplastic resin layer (C) as an inner layer and the polyamide-based resin layer (B) as an intermediate layer.

8. The multilayer molded article according to claim 1 which is a tube for feeding a coating or a hose for feeding a coating each having the thermoplastic polymer layer (A) as an outer layer, the thermoplastic resin layer (C) as an inner layer and the polyamide-based resin layer (B) as an intermediate layer.

9. The multilayer molded article according to claim 1 which is a tube for a drink or a hose for a drink each having the thermoplastic polymer layer (A) as an outer layer, the thermoplastic resin layer (C) as an inner layer and the polyamide-based resin layer (B) as an intermediate layer.

* * * * *